United States Patent
Chen et al.

(10) Patent No.: US 11,381,842 B2
(45) Date of Patent: Jul. 5, 2022

(54) METHODS FOR CODING OR DECODING VIDEO PARAMETER SET OR SEQUENCE PARAMETER SET

(71) Applicant: ALIBABA GROUP HOLDING LIMITED, Grand Cayman (KY)

(72) Inventors: Jie Chen, Beijing (CN); Jiancong Luo, Skillman, NJ (US); Yan Ye, San Diego, CA (US); Ru-Ling Liao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/214,220

(22) Filed: Mar. 26, 2021

(65) Prior Publication Data

US 2021/0306671 A1    Sep. 30, 2021

Related U.S. Application Data

(60) Provisional application No. 62/994,995, filed on Mar. 26, 2020.

(51) Int. Cl.
*H04N 19/70* (2014.01)
*H04N 19/46* (2014.01)
*H04N 19/169* (2014.01)

(52) U.S. Cl.
CPC ......... *H04N 19/70* (2014.11); *H04N 19/1883* (2014.11); *H04N 19/46* (2014.11); *H04N 19/188* (2014.11)

(58) Field of Classification Search
CPC .... H04N 19/70; H04N 19/1883; H04N 19/46; H04N 19/188
See application file for complete search history.

(56) References Cited

U.S. PATENT DOCUMENTS

| | | | |
|---|---|---|---|
| 2015/0373377 A1 | 12/2015 | Wang et al. | |
| 2017/0150160 A1 | 5/2017 | Deshpande | |
| 2018/0288420 A1 | 10/2018 | Lee et al. | |
| 2021/0203983 A1* | 7/2021 | Choi | H04N 19/174 |
| 2021/0306671 A1* | 9/2021 | Chen | H04N 19/1883 |
| 2021/0329303 A1* | 10/2021 | Deshpande | H04N 19/70 |

OTHER PUBLICATIONS

"Requirements for a Future Video Coding Standard v5," International Organisation for Standardisation, Torino, IT, 14 pages (2017).
Bross et al., "Versatile Video Coding (Draft 8)," JVET-Q2001-vD, 17th Meeting: Brussels, BE, Jan. 7-17, 2020, 509 pages.

(Continued)

*Primary Examiner* — Jae N Noh
(74) *Attorney, Agent, or Firm* — Finnegan, Henderson, Farabow, Garrett & Dunner, LLP

(57) ABSTRACT

The present disclosure provides a computer-implemented method for encoding video. The method includes: determining whether a coded video sequence (CVS) contains equal number of profile, tier and level (PTL) syntax structures and output layer sets (OLSs); and in response to the CVS containing equal number of PTL syntax structures and OLSs, coding the bitstream without signaling a first PTL syntax element specifying an index, to a list of PTL syntax structures in the VPS, of a PTL syntax structure that applies to a corresponding OLS in the VPS.

20 Claims, 21 Drawing Sheets

(56) References Cited

OTHER PUBLICATIONS

Chen et al., "Algorithm Description of Joint Exploration Test Model 7 (JEM 7)," JVET-G1001-v1, 7$^{th}$ Meeting: Torino, IT, Jul. 13-21, 2017, 50 pages.
Chen et al., "Algorithm Description of Joint Exploration Test Model 8 (JEM 8)," JVET-Q2002-v1, 17$^{th}$ Meeting: Brussels, BE, Jan. 7-17, 2020, 91 pages.
Hanhart et al., "AHG8: Horizontal geometry padding for PERP," JVET-K0333, 11$^{th}$ Meeting: Ljubljana, SI, Jul. 10-18, 2018, 4 pages.
Hanhart et al., "CE13: PERP with horizontal geometry padding of reference pictures (Test 3.3)," JVET-L0231, 2018, 11 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Jem, https://jvet.hhi.fraunhofer.de/svn/svn_HMJEMSoftware.
Sullivan et al., "Overview of the High Efficiency Video Coding (HEVC) Standard," IEE Transactions on Circuits and Systems for Video Technology, vol. 22, No. 12, pp. 1649-1668 (2012).
Zhou et al. "AHG8: Unrestricted Motion Compensation for 360 Video in ERP Format," JVET-E0065, 5$^{th}$ Meeting: Geneva, CH, Jan. 12-20, 2017, 3 pages.
PCT International Search Report and Written Opinion dated Jul. 12, 2021, issued in corresponding International Application No. PCT/US2021/024385 (9 pgs.).

* cited by examiner

| profile_tier_level( profileTierPresentFlag, maxNumSubLayersMinus1 ) { | Descriptor |
|---|---|
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
|   for( i = 0; i < maxNumSubLayersMinus1; i++ ) | |
|     ptl_sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( ptl_sublayer_level_present_flag[ i ] ) | |
|       sublayer_level_idc[ i ] | u(8) |
| } | |

FIG. 6A

| dpb_parameters( maxSubLayersMinus1, subLayerInfoFlag ) { | Descriptor |
|---|---|
|   for( i = ( subLayerInfoFlag ? 0 : maxSubLayersMinus1 ); <br>     i <= maxSubLayersMinus1; i++ ) { | |
|     max_dec_pic_buffering_minus1[ i ] | ue(v) |
|     max_num_reorder_pics[ i ] | ue(v) |
|     max_latency_increase_plus1[ i ] | ue(v) |
|   } | |
| } | |

| general_hrd_parameters( ) { | Descriptor |
|---|---|
| num_units_in_tick | u(32) |
| time_scale | u(32) |
| general_nal_hrd_params_present_flag | u(1) |
| general_vcl_hrd_params_present_flag | u(1) |
| general_same_pic_timing_in_all_ols_flag | u(1) |
| general_decoding_unit_hrd_params_present_flag | u(1) |
| if( general_decoding_unit_hrd_params_present_flag ) | |
|    tick_divisor_minus2 | u(8) |
| bit_rate_scale | u(4) |
| cpb_size_scale | u(4) |
| if( general_decoding_unit_hrd_params_present_flag ) | |
|    cpb_size_du_scale | u(4) |
| hrd_cpb_cnt_minus1 | ue(v) |
| } | |

| ols_hrd_parameters( firstSubLayer, maxSubLayers ) { | Descriptor |
|---|---|
| for( i = firstSubLayer; i <= maxSubLayers; i++ ) { | |
|   fixed_pic_rate_general_flag[ i ] | u(1) |
|   if( !fixed_pic_rate_general_flag[ i ] ) | |
|     fixed_pic_rate_within_cvs_flag[ i ] | u(1) |
|   if( fixed_pic_rate_within_cvs_flag[ i ] ) | |
|     elemental_duration_in_tc_minus1[ i ] | ue(v) |
|   else if( hrd_cpb_cnt_minus1 == 0 ) | |
|     low_delay_hrd_flag[ i ] | u(1) |
|   if( general_nal_hrd_params_present_flag ) | |
|     sublayer_hrd_parameters( i ) | |
|   if( general_vcl_hrd_params_present_flag ) | |
|     sublayer_hrd_parameters( i ) | |
|   } | |
| } | |

FIG. 7B

| | 800 |
|---|---|
| video_parameter_set_rbsp( ) { | Descriptor |
| ... | |
| 810 — vps_max_layers_minus1 | u(6) |
| vps_max_sublayers_minus1 | u(3) |
| 812 ... | |
| if( vps_max_layers_minus1 > 0 ) { | |
|   if( vps_all_independent_layers_flag ) | |
| 814 —     each_layer_is_an_ols_flag | u(1) |
|   if( !each_layer_is_an_ols_flag ) { | |
|     if( !vps_all_independent_layers_flag ) | |
| 816 —       ols_mode_idc | u(2) |
|     if( ols_mode_idc = = 2 ) { | |
| 818 —       num_output_layer_sets_minus1 | u(8) |
|       for( i = 1; i <= num_output_layer_sets_minus1; i ++ ) | |
|         for( j = 0; j <= vps_max_layers_minus1; j++ ) | |
| 820 —           ols_output_layer_flag[ i ][ j ] | u(1) |
|     } | |
| } | |
| 822 — vps_num_ptls_minus1       822d | u(8) |
| for( i = 0; i <= vps_num_ptls_minus1; i++ ) { | |
|   if( i > 0 ) | |
| 824 —     pt_present_flag[ i ] | u(1) |
|   if( vps_max_sublayers_minus1 > 0 && !vps_all_layers_same_num_sublayers_flag ) | |
| 826 —     ptl_max_temporal_id[ i ] | u(3) |
| } | |
| while( !byte_aligned( ) ) | |
| 828 —   vps_ptl_alignment_zero_bit  /* equal to 0 */ | f(1) |
| for( i = 0; i <= vps_num_ptls_minus1; i++ ) | |
|   profile_tier_level( pt_present_flag[ i ], ptl_max_temporal_id[ i ] ) | |
| for( i = 0; i < TotalNumOlss; i++ ) | |
|   if( vps_num_ptls_minus1 > 0 ) | |
| 830 —     ols_ptl_idx[ i ]       830d | u(8) |
| if( !vps_all_independent_layers_flag ) | |
| 832 —   vps_num_dpb_params | ue(v) |
| if( vps_num_dpb_params > 0 && vps_max_sublayers_minus1 > 0 ) | |
| 834 —   vps_sublayer_dpb_params_present_flag | u(1) |
| for( i = 0; i < vps_num_dpb_params; i++ ) { | |
|   if( vps_max_sublayers_minus1 > 0 && !vps_all_layers_same_num_sublayers_flag ) | |
| 836 —     dpb_max_temporal_id[ i ] | u(3) |
|   dpb_parameters( dpb_max_temporal_id[ i ], vps_sublayer_dpb_params_present_flag ) | |

FIG. 8

| | |
|---|---|
| } | |
| for( i = 0; i < TotalNumOlss; i++ ) { | |
|   if( NumLayersInOls[ i ] > 1 ) { | |
| 838 —     ols_dpb_pic_width[ i ] | ue(v) |
| 840 —     ols_dpb_pic_height[ i ] | ue(v) |
|     if( vps_num_dpb_params ≥ 1 ) | |
| 842 —       ols_dpb_params_idx[ i ] | ue(v) |
|   } | |
| } | |
| if( !each_layer_is_an_ols_flag ) | |
| 844 —   vps_general_hrd_params_present_flag | u(1) |
| if( vps_general_hrd_params_present_flag ) { | |
|   general_hrd_parameters( ) | |
|   if( vps_max_sublayers_minus1 > 0 ) | |
| 846 —     vps_sublayer_cpb_params_present_flag | u(1) |
| 848 —   num_ols_hrd_params_minus1 | ue(v) |
|   for( i = 0; i <= num_ols_hrd_params_minus1; i++ ) { | |
|     if( vps_max_sublayers_minus1 > 0 && !vps_all_layers_same_num_sublayers_flag ) | |
| 850 —       hrd_max_tid[ i ] | u(3) |
|     firstSubLayer = vps_sublayer_cpb_params_present_flag ? 0 : hrd_max_tid[ i ] | |
|     ols_hrd_parameters( firstSubLayer, hrd_max_tid[ i ] ) | |
|   } | |
|   if( num_ols_hrd_params_minus1 + 1 != TotalNumOlss && <br>    num_ols_hrd_params_minus1 > 0 ) | |
|   for( i = 1; i < TotalNumOlss; i++ ) { | |
|     if( NumLayersInOls[ i ] > 1 ) | |
| 852 —       ols_hrd_idx[ i ] | ue(v) |
|   } | |
|   ... | |
| } | |

| seq_parameter_set_rbsp( ) { | Descriptor |
|---|---|
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   ... | |
|   if( sps_max_sublayers_minus1 > 0 ) | |
|     sps_sublayer_dpb_params_flag | u(1) |
|   if( sps_ptl_dpb_hrd_params_present_flag ) | |
|     dpb_parameters( sps_max_sublayers_minus1, sps_sublayer_dpb_params_flag ) | |
|   ... | |
|   if( sps_ptl_dpb_hrd_params_present_flag ) { | |
|     sps_general_hrd_params_present_flag | u(1) |
|     if( sps_general_hrd_params_present_flag ) { | |
|       general_hrd_parameters( ) | |
|       if( sps_max_sublayers_minus1 > 0 ) | |
|         sps_sublayer_cpb_params_present_flag | u(1) |
|       firstSubLayer = sps_sublayer_cpb_params_present_flag ? 0 : sps_max_sublayers_minus1 | |
|       ols_hrd_parameters( firstSubLayer, sps_max_sublayers_minus1 ) | |
|     } | |
|   } | |
|   ... | |
| } | |

- 910: sps_seq_parameter_set_id
- 912: sps_video_parameter_set_id
- 914: sps_max_sublayers_minus1
- 916: sps_reserved_zero_4bits
- 918: sps_ptl_dpb_hrd_params_present_flag
- 920: sps_sublayer_dpb_params_flag
- 922: sps_general_hrd_params_present_flag
- 924: sps_sublayer_cpb_params_present_flag

| video_parameter_set_rbsp( ) { | Descriptor |
|---|---|
|   vps_num_ptls_minus1 | ~~u(8)~~ue(v) |
|   for( i = 0; i <= vps_num_ptls_minus1; i++ ) { | |
|     if( i > 0 ) | |
|       pt_present_flag[ i ] | u(1) |
|     if( vps_max_sublayers_minus1 > 0 && !vps_all_layers_same_num_sublayers_flag ) | |
|       ptl_max_temporal_id[ i ] | u(3) |
|   } | |
|   while( !byte_aligned( ) ) | |
|     vps_ptl_alignment_zero_bit  /* equal to 0 */ | f(1) |
|   for( i = 0; i <= vps_num_ptls_minus1; i++ ) | |
|     profile_tier_level( pt_present_flag[ i ], ptl_max_temporal_id[ i ] ) | |
|   for( i = 0; i < TotalNumOlss; i++ ) | |
|     if(vps_num_ptls_minus1 > 0 ) | |
|       ols_ptl_idx[ i ] | ~~u(8)~~ue(v) |

| video_parameter_set_rbsp( ) { | Descriptor |
|---|---|
|   vps_num_ptls_minus1 | u(8) |
|   for( i = 0; i <= vps_num_ptls_minus1; i++ ) { | |
|     if( i > 0 ) | |
|       pt_present_flag[ i ] | u(1) |
|     if( vps_max_sublayers_minus1 > 0 && !vps_all_layers_same_num_sublayers_flag ) | |
|       ptl_max_temporal_id[ i ] | u(3) |
|   } | |
|   while( !byte_aligned( ) ) | |
|     vps_ptl_alignment_zero_bit  /* equal to 0 */ | f(1) |
|   for( i = 0; i <= vps_num_ptls_minus1; i++ ) | |
|     profile_tier_level( pt_present_flag[ i ], ptl_max_temporal_id[ i ] ) | |
|   for( i = 0; i < TotalNumOlss; i++ ) | |
|     if(vps_num_ptls_minus1 > 0 ) | |
|       ols_ptl_idx[ i ] | ~~u(8)~~u(v) |

FIG. 10D

| | | 1100C |
|---|---|---|
| video_parameter_set_rbsp( ) { | | Descriptor |
| 822 →   vps_num_ptls_minus1    822d → | | u(8) |
|   for( i = 0; i <= vps_num_ptls_minus1; i++ ) { | | |
|     if( i > 0 ) | | |
| 824 →       pt_present_flag[ i ] | | u(1) |
|     if( vps_max_sublayers_minus1 > 0 && !vps_all_layers_same_num_sublayers_flag ) | | |
| 826 →       ptl_max_temporal_id[ i ] | | u(3) |
|   } | | |
|   while( !byte_aligned( ) ) | | |
| 828 →     vps_ptl_alignment_zero_bit /* equal to 0 */ | | f(1) |
|   for( i = 0; i <= vps_num_ptls_minus1; i++ ) | | |
|     profile_tier_level( pt_present_flag[ i ], ptl_max_temporal_id[ i ] ) | | |
|   for( i = 0; i < TotalNumOlss; i++ ) { | | |
| 1110C →     *if(vps_num_ptls_minus1+1 != TotalNumOlss && vps_num_ptls_minus1 > 0 )* | | |
| 830 →       ols_ptl_idx[ i ]    830d → | | u(8) |
|   if( !vps_all_independent_layers_flag ) | | |
| 832 →     vps_num_dpb_params | | ue(v) |
|   if( vps_num_dpb_params > 0 && vps_max_sublayers_minus1 > 0 ) | | |
| 834 →     vps_sublayer_dpb_params_present_flag | | u(1) |
|   for( i = 0; i < vps_num_dpb_params; i++ ) { | | |
|     if( vps_max_sublayers_minus1 > 0 && !vps_all_layers_same_num_sublayers_flag ) | | |
| 836 →       dpb_max_temporal_id[ i ] | | u(3) |
|     dpb_parameters( dpb_max_temporal_id[ i ], vps_sublayer_dpb_params_present_flag ) | | |
|   } | | |
|   for( i = 0; i < TotalNumOlss; i++ ) { | | |
|     if( NumLayersInOls[ i ] > 1 ) { | | |
| 838 →       ols_dpb_pic_width[ i ] | | ue(v) |
| 840 →       ols_dpb_pic_height[ i ] | | ue(v) |
| 1120C →       *if(vps_num_dpb_params != TotalNumOlss && vps_num_dpb_params > 1 )* | | |
| 842 →         ols_dpb_params_idx[ i ] | | ue(v) |
|     } | | |
|   } | | |
|   ... | | |
| } | | |

| video_parameter_set_rbsp( ) { | Descriptor |
|---|---|
| ... | |
|   vps_max_layers_minus1 | u(6) |
| ... | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc == 2 ) { | |
|         num_output_layer_sets_minus1 | ~~u(8)~~ u(v) |
|         for( i = 1; i <= num_output_layer_sets_minus1; i ++) | |
|           for( j = 0; j <= vps_max_layers_minus1; j++) | |
|             ols_output_layer_flag[ i ][ j ] | u(1) |
|       } | |
|     } | |
|   } | |
| ... | |
| } | |

810 → vps_max_layers_minus1
814 → each_layer_is_an_ols_flag
816 → ols_mode_idc
818 → num_output_layer_sets_minus1
818d → u(v)
820 → ols_output_layer_flag[ i ][ j ]

| seq_parameter_set_rbsp( ) { | Descriptor |
|---|---|
| ... | |
| ~~if( sps_max_sublayers_minus1 > 0 )~~ | |
| ~~sps_sublayer_dpb_params_flag~~ | ~~u(1)~~ |
| if( sps_ptl_dpb_hrd_params_present_flag ){ | |
|     if( sps_max_sublayers_minus1 > 0 ) | |
|         sps_sublayer_dpb_params_flag | u(1) |
|     dpb_parameters( sps_max_sublayers_minus1, sps_sublayer_dpb_params_flag ) | |
| } | |
| ... | |
| } | |

920 → sps_sublayer_dpb_params_flag

FIG. 12C

METHODS FOR CODING OR DECODING VIDEO PARAMETER SET OR SEQUENCE PARAMETER SET

CROSS-REFERENCE TO RELATED APPLICATIONS

The disclosure claims the benefits of priority to U.S. Provisional Application No. 62/994,995, filed on Mar. 26, 2020, which is incorporated herein by reference in its entirety.

TECHNICAL FIELD

The present disclosure generally relates to video processing, and more particularly, to video processing methods for signaling Video Parameter Set (VPS) and Sequence Parameter Set (SPS).

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a computer-implemented method for encoding video. In some embodiments, the method includes: determining whether a coded video sequence (CVS) contains equal number of profile, tier and level (PTL) syntax structures and output layer sets (OLSs); and in response to the CVS containing equal number of PTL syntax structures and OLSs, coding the bitstream without signaling a first PTL syntax element specifying an index, to a list of PTL syntax structures in the VPS, of a PTL syntax structure that applies to a corresponding OLS in the VPS.

In some embodiments, the method includes: determining whether a coded video sequence (CVS) has equal number of decoded picture buffer (DPB) parameter syntax structures and output layer sets (OLSs); and in response to the CVS having equal number of DPB parameter syntax structures and OLSs, coding the bitstream without signaling a first DPB syntax element specifying an index, to a list of DPB parameter syntax structures in the VPS, of a DPB parameter syntax structure that applies to a corresponding OLS.

In some embodiments, the method includes: determining whether at least one of a profile, tier and level (PTL) syntax structure, a decoded picture buffer (DPB) parameters syntax structure, or a hypothetical reference decoder (HRD) parameters syntax structure is present in a Sequence Parameter Set (SPS) of a bitstream; determining whether a first value is greater than one, the first value specifying a maximum number of temporal sublayers present in a coded layer video sequence (CLVS) referring to the SPS; and when at least one of the PTL syntax structure, the DPB parameters syntax structure, or the HRD parameters syntax structure is present in the SPS and the first value is greater than one, signaling a flag configured to control a presence of syntax elements in the DPB parameters syntax structure in the SPS.

In some embodiments, the method includes: determining a value of a first Sequence Parameter Set (SPS) syntax element, the first SPS syntax element specifying an identifier of a video parameter set (VPS) referred to by the SPS when the value of the first SPS syntax element is greater than zero; in response to the value of the first SPS syntax element is greater than zero, assigning a range of a second SPS syntax element specifying a maximum number of temporal sublayers present in each coded layer video sequence (CLVS) referring to the SPS based on a corresponding VPS syntax element; and in response to the value of the first SPS syntax element equal to zero, assigning the range of the second SPS syntax element specifying the maximum number of temporal sublayers present in each CLVS referring to the SPS to be an inclusive range of zero to a fixed value.

In some embodiments, the method includes: coding one or more profile, tier and level (PTL) syntax elements specifying PTL related information; and signaling the one or more PTL syntax elements with the variable length in a video parameter set (VPS) or a Sequence Parameter Set (SPS) of a bitstream.

In some embodiments, the method includes: coding a video parameter set (VPS) syntax element with variable length; and signaling, in a VPS, the VPS syntax element, the VPS syntax element being associated with the number of output layer sets (OLSs) contained in a coded video sequence (CVS) referring to the VPS.

Embodiments of the present disclosure provide a computer-implemented method for decoding video. In some embodiments, the method includes: receiving a bitstream comprising a coded video sequence (CVS); determining whether the CVS has equal number of profile, tier and level (PTL) syntax structures and output layer sets (OLSs); and in response to the number of PTL syntax structures being equal to the number of the OLSs, skipping decoding a first PTL syntax element specifying an index, to a list of PTL syntax structures in the VPS, of a PTL syntax structure that applies to a corresponding OLS when decoding the VPS.

In some embodiments, the method includes: receiving a bitstream comprising a coded video sequence (CVS); determining whether the CVS has equal number of decoded picture buffer (DPB) parameter syntax structures and output layer sets (OLSs); and in response to the CVS having equal number of DPB parameter syntax structures and OLSs, skipping decoding a first DPB syntax element specifying an index, to a list of DPB parameter syntax structures in the VPS, of an DPB parameter syntax structure that applies to a corresponding OLS.

In some embodiments, the method includes: receiving a bitstream comprising a video parameter set (VPS) and a Sequence Parameter Set (SPS); in response to at least one of a profile, tier and level (PTL) syntax structure, a decoded picture buffer (DPB) parameters syntax structure, or a hypothetical reference decoder (HRD) parameters syntax structure being present in the SPS, determining whether a first value specifying a maximum number of temporal sublayers being present in each coded layer video sequence (CLVS) referring to the SPS is greater than one; and in response to the first value being greater than one, decoding a flag configured to control a presence of syntax elements in the DPB parameters syntax structure in the SPS.

In some embodiments, the method includes: determining a value of a first Sequence Parameter Set (SPS) syntax element, the first SPS syntax element specifying an identifier of a video parameter set (VPS) referred to by a SPS when the value of the first SPS syntax element is greater than zero; and decoding a second SPS syntax element specifying a maximum number of temporal sublayers present in each coded layer video sequence (CLVS) referring to the SPS, a range of the second SPS syntax element being based on a corresponding VPS syntax element of the VPS referred to by the SPS when the value of the first SPS syntax element is greater than zero, or being based on a fixed value when the value of the first SPS syntax element is equal to zero.

In some embodiments, the method includes: receiving a bitstream comprising a video parameter set (VPS) or a Sequence Parameter Set (SPS); and decoding one or more profile, tier and level (PTL) syntax elements in the VPS or the SPS, the one or more PTL syntax elements specifying PTL related information.

In some embodiments, the method includes: receiving a bitstream comprising a video parameter set (VPS); and decoding a VPS syntax element with a variable length in the VPS, the VPS syntax element being associated with the number of output layer sets (OLSs) contained in a coded video sequence (CVS) referring to the VPS.

Embodiments of the present disclosure provide an apparatus. In some embodiments, the apparatus includes a memory configured to store instructions; and a processor coupled to the memory and configured to execute the instructions to perform the computer-implemented method for encoding video. In some embodiments, the apparatus includes a memory configured to store instructions; and a processor coupled to the memory and configured to execute the instructions to perform the computer-implemented method for decoding video.

Embodiments of the present disclosure provide a non-transitory computer-readable storage medium storing a set of instructions that are executable by one or more processors of a device to cause the device to perform a method for encoding video.

Embodiments of the present disclosure provide a non-transitory computer-readable storage medium storing a set of instructions that are executable by one or more processors of a device to cause the device to perform a method for decoding video.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6A illustrates an exemplary coding syntax table of a PTL syntax structure, consistent with some embodiments of the disclosure.

FIG. 6B illustrates an exemplary coding syntax table of a DPB parameters syntax structure, consistent with some embodiments of the disclosure.

FIG. 7A illustrates an exemplary coding syntax table of HRD parameters syntax structures, consistent with some embodiments of the disclosure.

FIG. 7B illustrates another exemplary coding syntax table of HRD parameters syntax structures, consistent with some embodiments of the disclosure.

FIG. 8 illustrates an exemplary coding syntax table of a portion of VPS raw byte sequence payload (RBSP) syntax structure, consistent with some embodiments of the disclosure.

FIG. 9 illustrates an exemplary coding syntax table of a portion of SPS RBSP syntax structure, consistent with some embodiments of the disclosure.

FIG. 10C illustrates a portion of an exemplary VPS syntax structure, consistent with some embodiments of the present disclosure.

FIG. 10D illustrates a portion of an exemplary VPS syntax structure, consistent with some embodiments of the present disclosure.

FIG. 11C illustrates a portion of an exemplary VPS syntax structure, consistent with some embodiments of the present disclosure.

FIG. 11D illustrates a portion of an exemplary VPS syntax structure, consistent with some embodiments of the present disclosure.

FIG. 12C illustrates a portion of an exemplary SPS syntax structure, consistent with some embodiments of the present disclosure.

DETAILED DESCRIPTION

Figure 1:
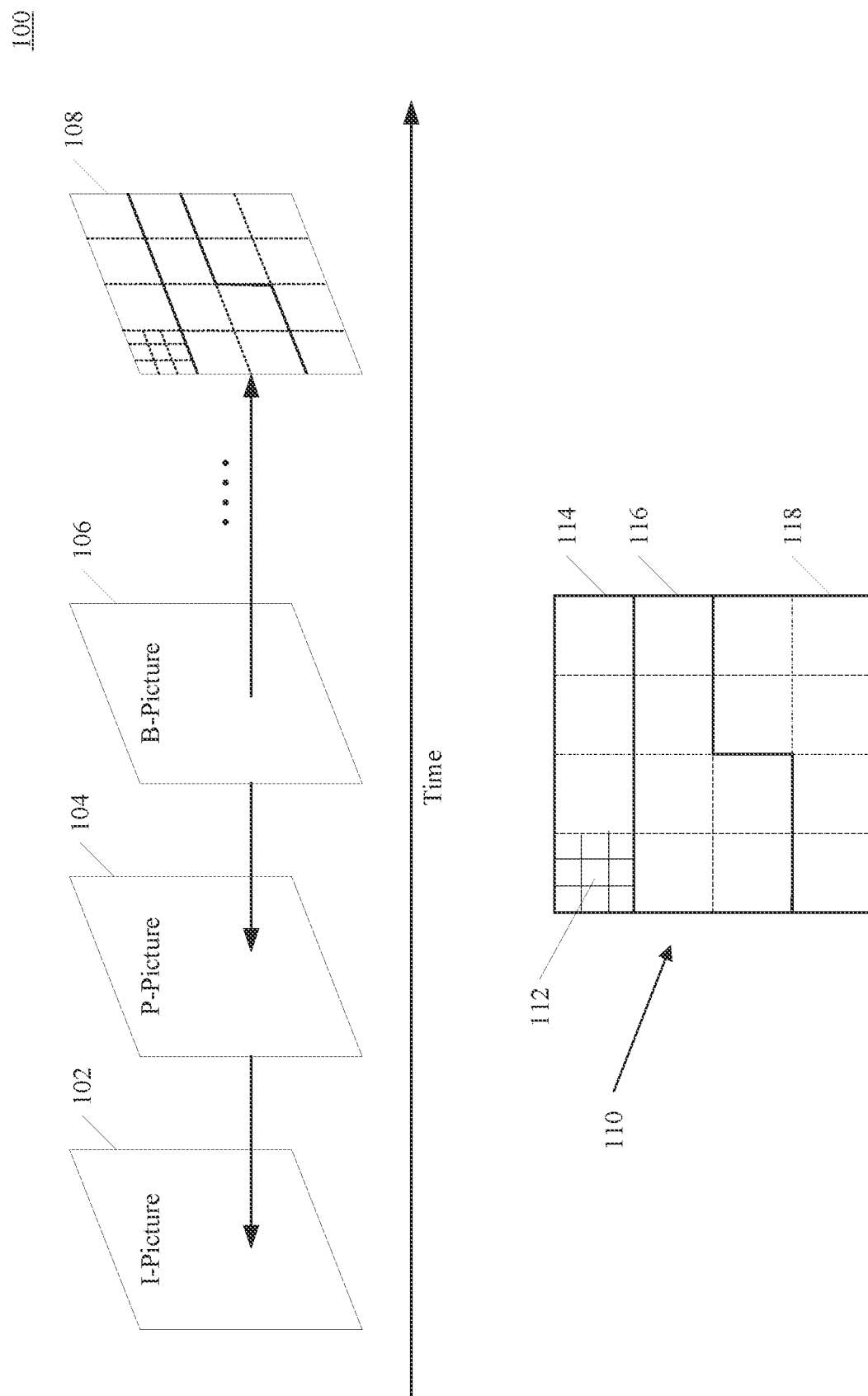
FIG. 1 is a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
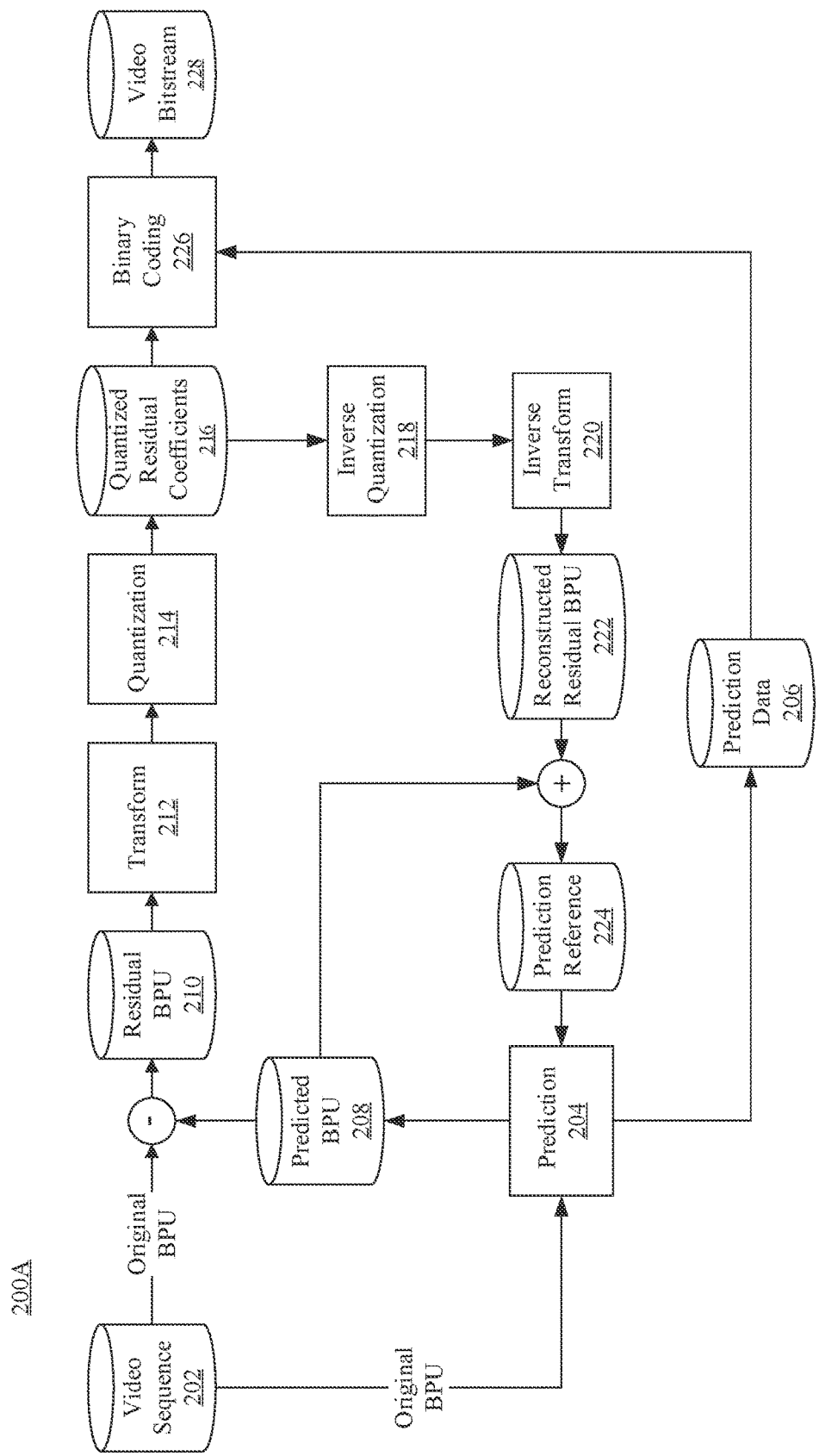
FIG. 2A is a schematic diagram illustrating an exemplary encoding process of a hybrid video coding system, consistent with embodiments of the disclosure.
Figure 2B:
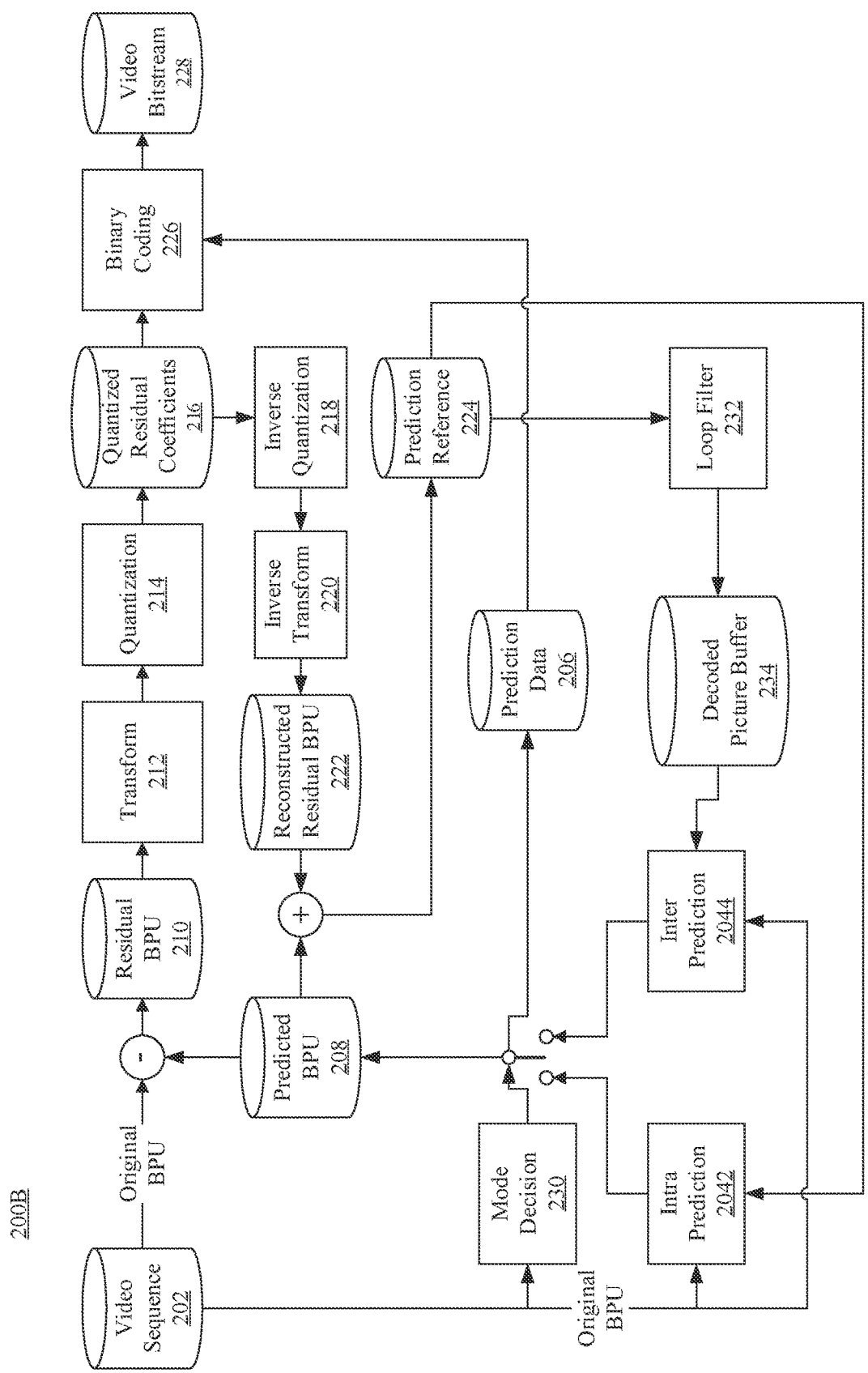
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3-3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate prediction reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and prediction data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets (SAOs), adaptive loop filters (ALFs), or the like. The loop-filtered reference picture can be stored in buffer 234 (or "decoded picture buffer (DPB)") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
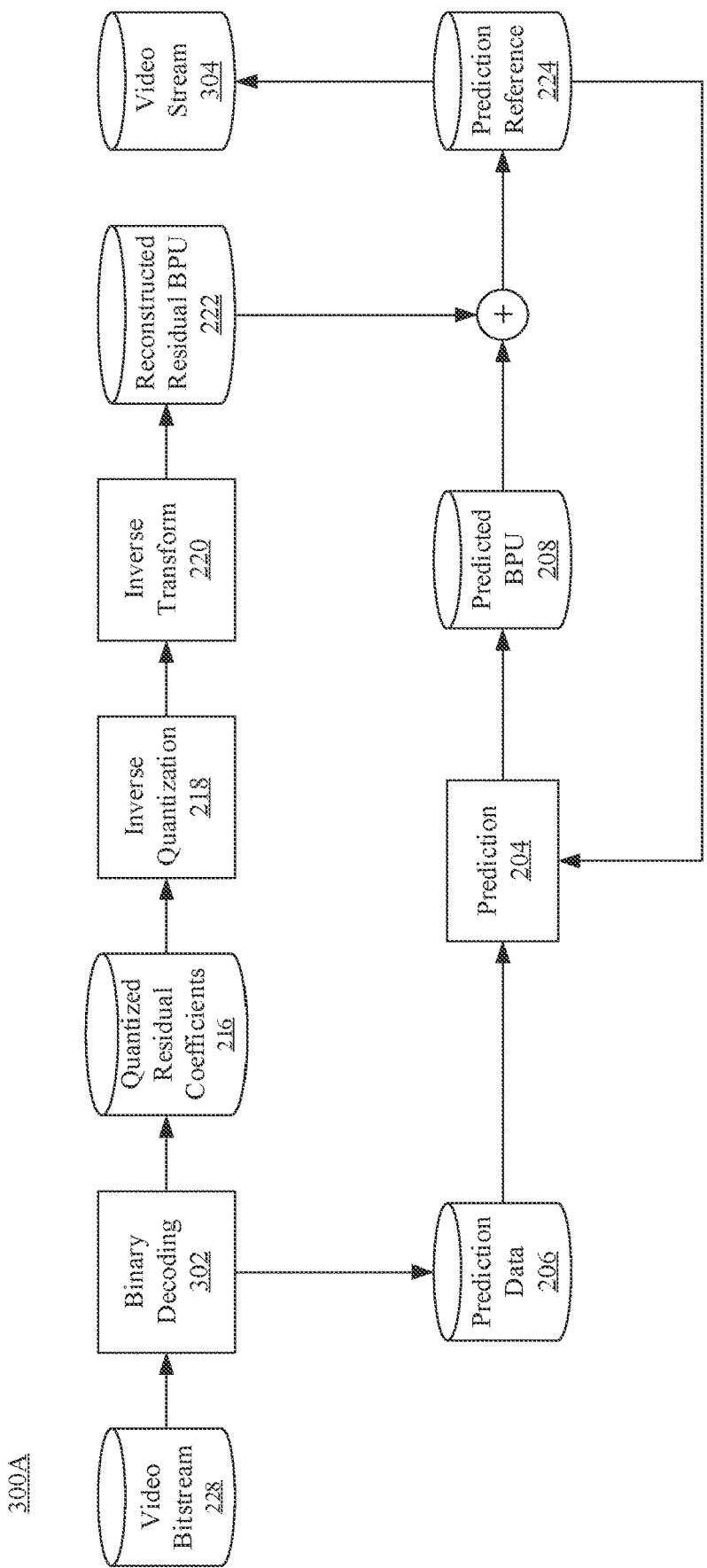
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed prediction reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
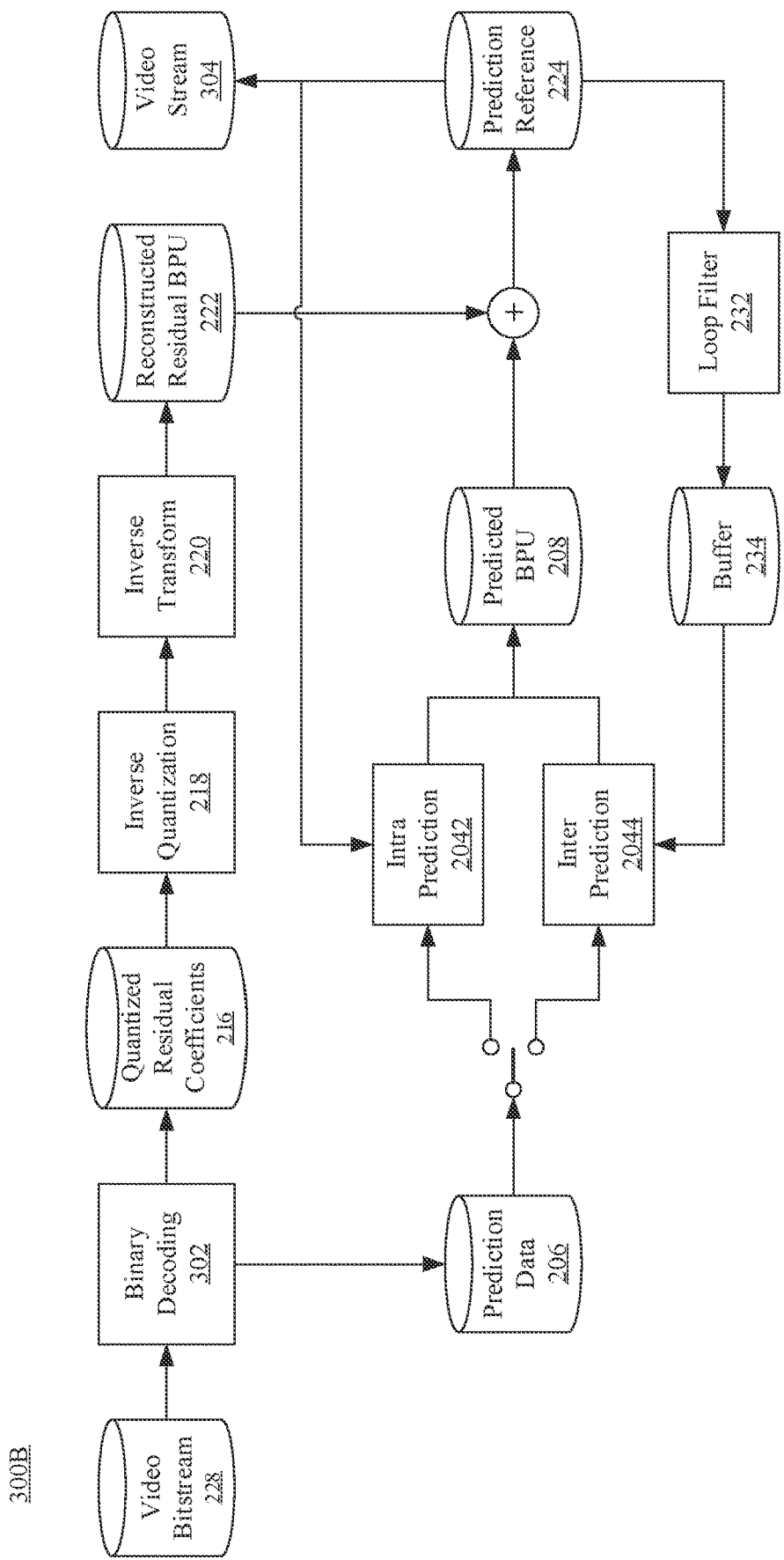
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer (DPB) in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength). Reconstructed pictures from buffer 234 can also be sent to a display, such as a TV, a PC, a smartphone, or a tablet to be viewed by end-users.

Figure 4:
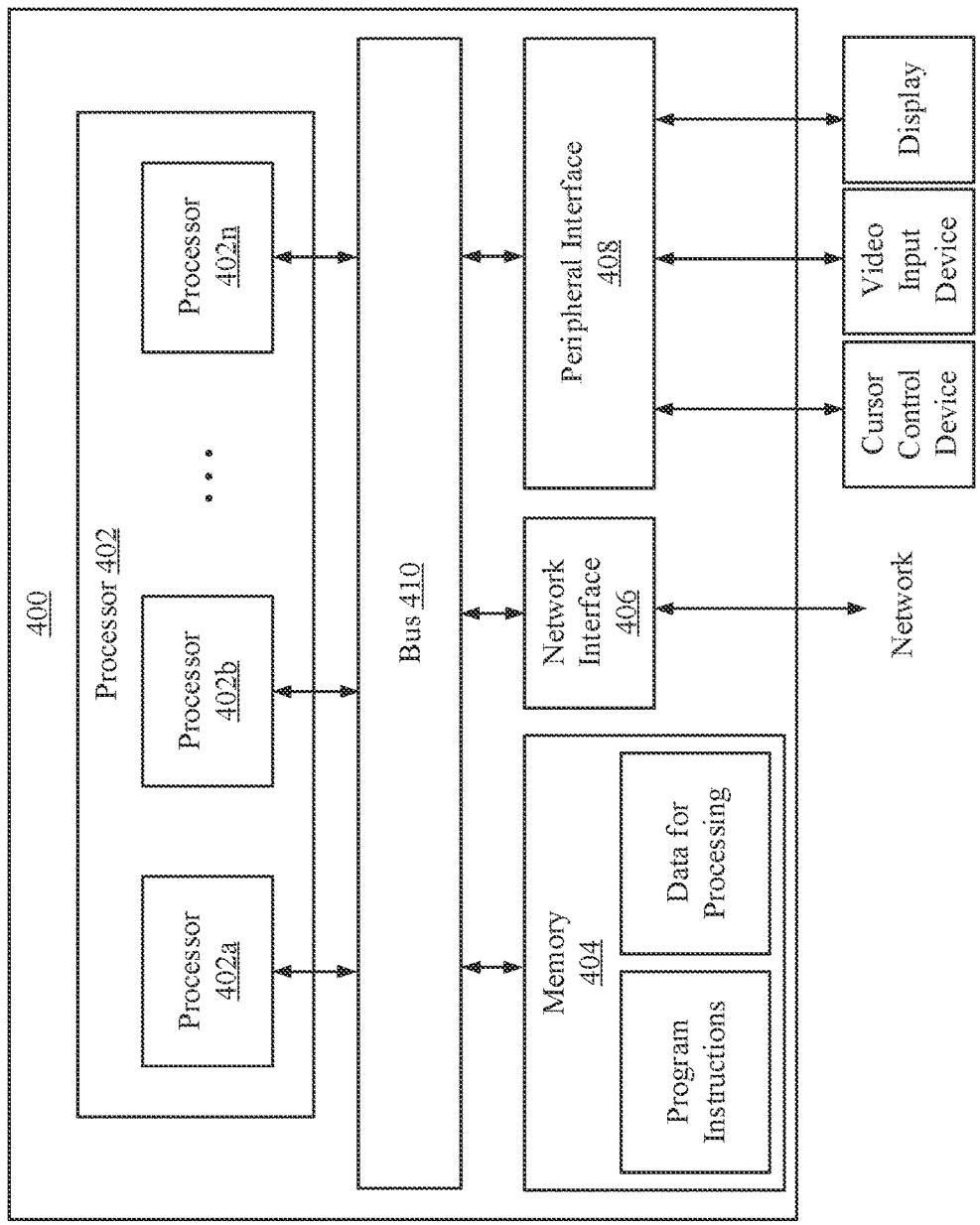
FIG. 4 is a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
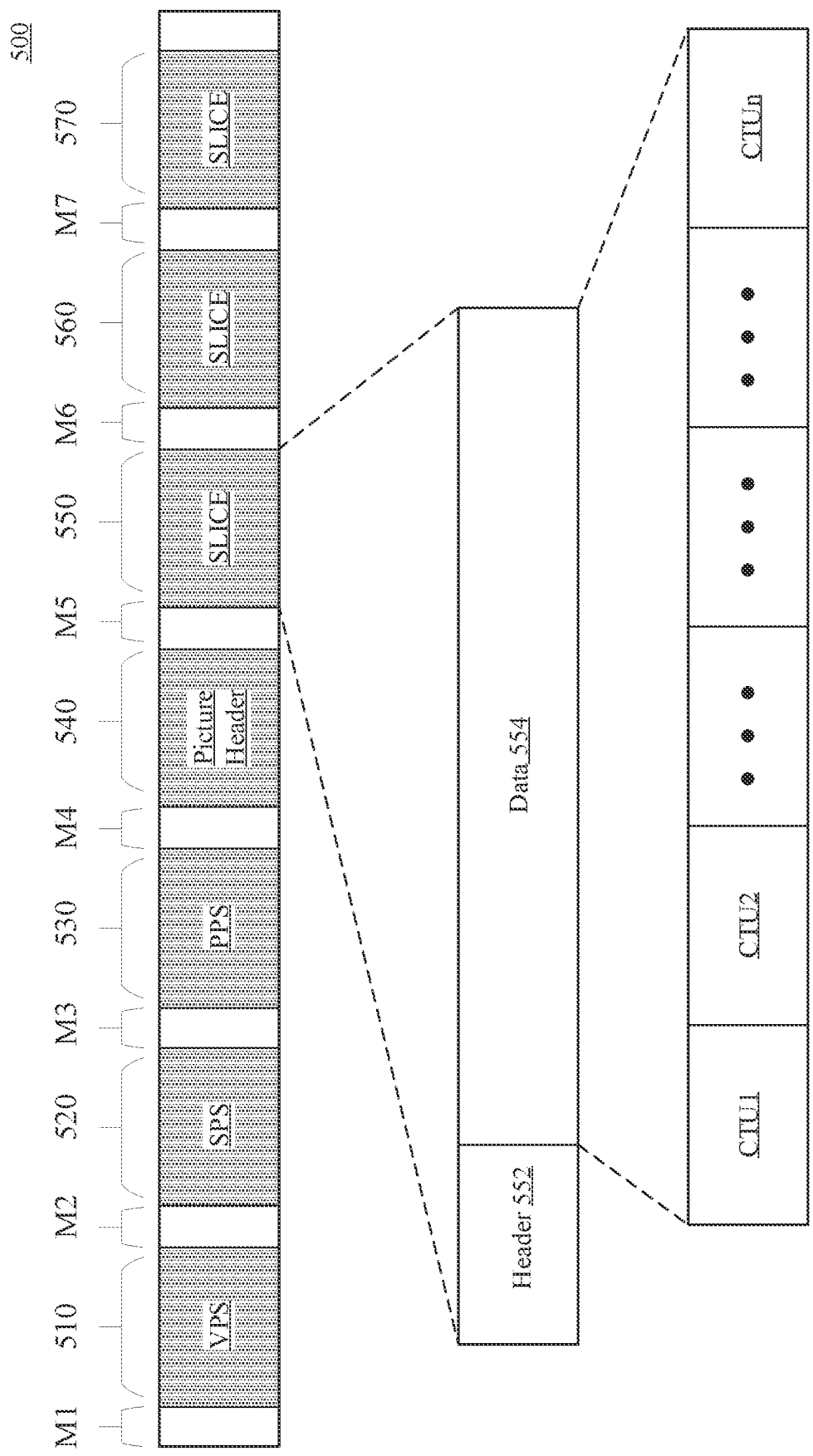
FIG. 5 is a schematic diagram of an exemplary bitstream, consistent with some embodiments of the present disclosure.

FIG. 5 is a schematic diagram of an example of a bitstream 500 encoded by the encoder, consistent with some embodiments of the present disclosure. In some embodiments, the structure of bitstream 500 can be applied for video bitstream 228 shown in FIGS. 2A-2B and FIGS. 3A-3B. In FIG. 5, bitstream 500 includes a Video Parameter Set (VPS) 510, a Sequence Parameter Set (SPS) 520, a Picture Parameter Set (PPS) 530, a Picture Header 540, Slices 550-570, which are separated by synchronization markers M1-M7. Slices 550-570 each include corresponding header blocks (e.g., header 552) and data blocks (e.g., data 554), each data block including one or more CTUs (e.g., CTU1-CTUn in data 554).

According to some embodiments, bitstream 500, which is a sequence of bits in form of network abstraction layer (NAL) unit or byte stream, forms one or more coded video sequences (CVS). A CVS includes one or more coded layer video sequences (CLVS). In some embodiments, a CLVS is a sequence of picture units (PUs) and each PU contains one coded picture. Particularly, a PU includes zero or one picture header NAL unit (e.g., Picture Header 540) which contains picture header syntax structure as payload, one coded picture which includes one or more video coding layer (VCL) NAL units, and, optionally, one or more other non-VCL NAL units. A VCL NAL unit is a collective term for coded slice NAL units (e.g., Slices 550-570) and the subset of NAL units that have reserved values of NAL unit type that are classified as VCL NAL units in some embodiments. A coded slice NAL unit contains a slice header and a slice data block (e.g., header 552 and data 554).

In other words, in some embodiments of the present disclosure, a layer can be a set of video coding layer (VCL) NAL units having a particular value of NAL layer ID and associated non-VCL NAL unit(s). Among these layers, inter-layer prediction may be applied between different layers to achieve high compression performance.

In some embodiments, an Output Layer Set (OLS) can be specified to support decoding some but not all the layers. The OLS is a set of layers including a specified set of layers where one or more layers in the set of layer are specified to be output layers. Therefore, an OLS can contain one or more output layers and other layers needed to decode the output layer(s) for inter-layer prediction.

In some embodiments, "profile", "tier" and "level" (collectively known as "PTL") are used to specify restrictions on bitstreams and hence limits on the capabilities needed to decode the bitstreams. Profiles, tiers, and levels may also be used to indicate interoperability points between individual decoder implementations. A "profile" is a subset of the bitstream syntax and specifies a subset of algorithmic features and limits that can be supported by decoders conforming to that profile. Within the bounds imposed by the syntax of a given profile, it is possible to require a variation in the performance of encoders and decoders depending upon the values taken by syntax elements in the bitstream such as the specified size of the decoded pictures. In some applications, it may be neither practical nor economical to implement a decoder capable of dealing with all hypothetical uses of the syntax within a particular profile.

In addition, "tiers" and "levels" are specified within each profile. A level of a tier is a specified set of constraints imposed on values of the syntax elements in the bitstream. These constraints may be simple limits on values. Alternatively, they may take the form of constraints on arithmetic combinations of values (e.g., picture width multiplied by picture height multiplied by number of pictures decoded per second). In some embodiments, the same set of tier and level definitions are used with all profiles. Some implementations may support a different tier and a different level within a tier for each supported profile. For a given profile, a level of a tier generally corresponds to a particular decoder processing load and memory capability. A level specified for a lower tier may be more constrained than a level specified for a higher tier.

FIG. 6A illustrates an exemplary coding syntax table of a PTL syntax structure 600A signaled in the VPS or the SPS, with emphasis in bold, consistent with some embodiments of the disclosure. In some embodiments, the PTL related information for each operation point identified by parameters TargetOlsIdx and Htid, can be indicated through parameters 610A and 620A (e.g., general_profile_idc and general_tier_flag) in PTL syntax structure 600A, and a parameter 630A (e.g., sublayer_level_idc[Htid]) found in or derived from the PTL syntax structure, which is signaled in Video Parameter Set (VPS) or Sequence Parameter Set (SPS). TargetOlsIdx is a variable to be used to identify an OLS index of the target OLS to be decoded, and Htid is a variable to be used to identify the highest temporal sublayer to be decoded.

As explained in the paragraphs above, the Decoded Picture Buffer (DPB) contains picture storage buffers for storage of decoded pictures. Each of the picture storage buffers may contain a decoded picture that is marked as "used for reference" or is held for future output. In some embodiments, processes are specified to be applied sequentially and are separately applied for each layer, starting from the lowest layer in the OLS, in increasing order of nub_layer_id values of the layers in the OLS, in which nuh_layer_id is an parameter specifies the identifier of the layer to which a VCL NAL unit belongs or the identifier of a layer to which a non-VCL NAL unit applies. In some embodiments, the value of nuh_layer_id shall be the same for VCL NAL units of the coded picture or the PU. The processes include a process of the output and removal of pictures from the DPB before decoding of the current picture, a process of current decoded picture marking and storage, a process of additional bumping.

FIG. 6B illustrates an exemplary coding syntax table of a DPB parameters syntax structure 600B signaled in the VPS or the SPS, with emphasis in bold, consistent with some embodiments of the disclosure. As shown in FIG. 6B, DPB parameters 610B, 620B, and 630B, which are parameters required to apply the above processes and check the conformance of bitstream, can be found in or derived from DPB parameters syntax structure 600B signaled in the VPS or the SPS. These parameters may include max_dec_pic_buffering_minus1[Htid], max_num_reorder_pics[Htid], and MaxLatencyPictures[Htid]).

In some embodiments, parameter 610B (e.g., max_dec_pic_buffering_minus1[i]) plus 1 specifies the maximum required size of the DPB in units of picture storage buffers for Htid being equal to the index i. The value of parameter 610B can be in an inclusive range of 0 to MaxDpbSize−1. MaxDpbSize is a parameter specifying the maximum decoded picture buffer size in units of picture storage buffers. When the index i is greater than 0, max_dec_pic_buffering_minus1[i] shall be greater than or equal to max_dec_pic_buffering_minus1[i−1]. When max_dec_pic_buffering_minus1[i] is not present for the index i in the inclusive range of 0 to maxSubLayersMinus1− 1, due to subLayerInfoFlag being equal to 0, parameter 610B is inferred to be equal to max_dec_pic_buffering_minus1[maxSubLayersMinus1].

Parameter 620B (e.g., max_num_reorder_pics[i]) specifies the maximum allowed number of pictures of the OLS that can precede any picture in the OLS in decoding order and follow that picture in output order for Htid being equal to the index i. The value of parameter 620B can be in the inclusive range of 0 to max_dec_pic_buffering_minus1[i]. When the index i is greater than 0, parameter 620B can be greater than or equal to max_num_reorder_pics[i−1]. When parameter 620B is not present for the index i in the inclusive range of 0 to maxSubLayersMinus1 minus 1, due to subLayerInfoFlag being equal to 0, parameter 620B is inferred to be equal to max_num_reorder_pics[maxSubLayersMinus1].

Parameter 630B can be used to compute the value of MaxLatencyPictures[i], which specifies the maximum number of pictures in the OLS that can precede any picture in the OLS in output order and follow that picture in decoding order for Htid being equal to the index i. When parameter 630B is equal to zero, no corresponding limit is expressed. When parameter 630B is not equal to 0, the value of MaxLatencyPictures[i] can be determined based on the following equation:

$$\text{MaxLatencyPictures}[i] = \text{max\_num\_reorder\_pics}[i] + \text{max\_latency\_increase\_plus1}[i] - 1 \quad \text{(Eq. 1)}$$

The value of parameter 630B can be in the inclusive range of 0 to $2^{32}-2$. When parameter 630B is not present for the index i in the inclusive range of 0 to maxSubLayersMinus1 minus 1, due to subLayerInfoFlag being equal to 0, parameter 630B is inferred to be equal to max_latency_increase_plus1[maxSubLayersMinus1].

Hypothetical reference decoder (HRD) is a hypothetical decoder model that specifies constraints on the variability of conforming NAL unit streams or conforming byte streams that an encoding process may produce and can be used to check bitstream and decoder conformance. Two types of bitstreams or bitstream subsets are subject to HRD conformance checking for VVC. The first type, named a Type I bitstream, is a NAL unit stream containing the VCL NAL units and NAL units with nal_unit_type equal to filler data NAL units (FD NUTs) for all Access Units (AUs) in the bitstream. The second type, named a Type II bitstream, contains, in addition to the VCL NAL units and filler data NAL units for all AUs in the bitstream, at least one of (1) additional non-VCL NAL units other than filler data NAL units, or (2) all leading_zero_8bits syntax element, zero byte syntax element, start_code_prefix_one_3 bytes syntax element and trailing_zero_8bits syntax element that form a byte stream from the NAL unit stream. In some embodiments, the leading_zero_8bits is a byte equal to 0x00, the zero_byte is a single byte equal to 0x00, the start_code_prefix_one_3 bytes is a fixed-value sequence of 3 bytes equal to 0x00000, which is called a start code prefix, and the trailing_zero_8bits is a byte equal to 0x00. In some embodiments, the leading_zero_8bits syntax element is present in the first byte stream NAL unit of the bitstream. Any bytes equal to 0x00 that follow a NAL unit syntax structure and precede the four-byte sequence 0x0000000 (which is to be interpreted as a zero byte syntax element followed by a start_code_prefix_one_3 bytes syntax element) will be considered to be trailing_zero_8bits syntax elements that are part of the preceding byte stream NAL unit.

FIG. 7A and FIG. 7B illustrate exemplary coding syntax tables of HRD parameters syntax structures 700A and 700B, respectively, with emphasis in bold, consistent with some embodiments of the disclosure. 700A and 700B may be signaled in the VPS or the SPS. As shown in FIG. 7A and FIG. 7B, two sets of HRD parameters (NAL HRD parameters and VCL HRD parameters) can be used. The HRD parameters can be signaled through a General HRD parameters syntax structure 700A in FIG. 7A and an OLS HRD parameters syntax structure 700B in FIG. 7B, which may be part of the VPS or part of the SPS.

As explained above, the OLSs, the PTL syntax structure (e.g., PTL syntax structure 600A in FIG. 6A), the DPB parameter syntax structure (e.g., DPB parameters syntax structure 600B in FIG. 6B) and HRD parameter syntax structure (e.g., syntax structures 700A, 700B in FIG. 7A and FIG. 7B) can be signaled in VPS or SPS. For each of these syntax structure, the VPS or the SPS signals a set of syntax structures as well as an index of syntax structure which is applied to each OLS.

FIG. 8 illustrates an exemplary coding syntax table of a portion of VPS raw byte sequence payload (RBSP) syntax structure 800 signaled in the VPS, with emphasis in bold, consistent with some embodiments of the disclosure. As shown in FIG. 8, VPS parameter 810 (vps_max_layers_minus1) plus 1 specifies the maximum allowed number of layers in each CVS referring to the VPS. VPS parameter 812 (vps_max_sublayers_minus1) plus 1 specifies the maximum number of temporal sublayers that may be present in a layer in each CVS referring to the VPS. In some embodiments, the value of VPS parameter 812 is in the inclusive range of 0 to a predefined static value (e.g., 6). VPS parameter 814 (each_layer_is_an_ols_flag) equal to 1 indicates that each OLS contains one layer and each layer itself in a CVS referring to the VPS is an OLS with the single included layer being the only output layer. VPS parameter 814 equal to 0 indicates that an OLS may contain more than one layer. If VPS parameter 810 is equal to 0, the value of VPS parameter 814 is inferred to be equal to 1. In some embodiments, if a corresponding flag specifying that one or more of the layers specified by the VPS may use inter-layer prediction (e.g., vps_all_independent_layers_flag being equal to 0), the value of VPS parameter 814 is inferred to be equal to 0.

In some embodiments, the value of VPS parameter 816 (ols_mode_idc) can be in the inclusive range of 0 to 2, and a value of 3 of VPS parameter 816 can be reserved for future use. In some embodiments, VPS parameter 816 equal to 0 specifies that the total number of OLSs specified by the VPS (TotalNumOlss) is equal to the value of VPS parameter 810 plus 1, the i-th OLS includes the layers with layer indices from 0 to the index i, inclusive, and for each OLS only the highest layer in the OLS is output. VPS parameter 816 equal to 1 specifies that the total number of OLSs specified by the VPS is equal to VPS parameter 810 plus 1, the i-th OLS includes the layers with layer indices from 0 to the index i, inclusive, and for each OLS all layers in the OLS are output. VPS parameter 816 equal to 2 specifies that the total number of OLSs specified by the VPS is explicitly signalled using VPS parameter 818 and for each OLS the output layers are explicitly signalled and other layers are the layers that are direct or indirect reference layers of the output layers of the OLS.

In some embodiments, when a corresponding flag specifies that all layers specified by the VPS are independently coded without using inter-layer prediction (e.g., vps_all_independent_layers_flag being equal to 1) and VPS parameter 814 is equal to 0, the value of VPS parameter 816 is inferred to be equal to 2.

When VPS parameter 816 is equal to 2, VPS parameter 818 (num_output_layer_sets_minus1) is signaled to indicates the total number of OLSs minus 1. In other words, VPS parameter 818 plus 1 specifies the total number of OLSs (e.g., the variable TotalNumOlss) specified by the VPS when VPS parameter 816 is equal to 2. The variable TotalNumOlss can be derived and computed from the codes as follows:

```
if( vps_max_layers_minus1 = = 0 )
    TotalNumOlss = 1
else if( each_layer_is_an_ols_flag | |
    ols_mode_idc = = 0 | | ols_mode_idc = = 1 )
    TotalNumOlss = vps_max_layers_minus1 + 1
else if( ols_mode_ide = = 2 )
    TotalNumOlss = num_output_layer_sets_minus1 + 1
```

In addition, when VPS parameter 816 is equal to 2, VPS parameter 820 (ols_output_layer_flag[i][j]) equal to 1 specifies that the j-th layer (i.e. the layer with nuh_layer_id equal to vps_layer_id[j]), is an output layer of the i-th OLS, and VPS parameter 820 equal to 0 specifies that the j-th layer is not an output layer of the i-th OLS. Alternatively stated, each OLS can be defined for each layer in CVS to indicate whether the layer is a output layer or not in a certain OLS by signaling a corresponding flag (e.g., VPS parameter 820).

VPS parameter 822 (vps_num_ptls_minus1) plus 1 specifies the number of PTL syntax structures in the VPS. The value of VPS parameter 822 can be less than a total number of OLSs (i.e., TotalNumOlss).

VPS parameter 824 (pt_present_flag[i]) equal to 1 specifies that profile, tier, and general constraints information are present in the i-th PTL syntax structure in the VPS. The VPS parameter 824 equal to 0 specifies that profile, tier, and general constraints information are not present in the i-th PTL syntax structure in the VPS. In some embodiments, the value of pt_present_flag[0] is inferred to be equal to 1. When VPS parameter 824 is equal to 0, the profile, tier, and general constraints information for the i-th PTL syntax structure in the VPS are inferred to be the same as that for the (i−1)-th PTL syntax structure in the VPS.

VPS parameter 826 (ptl_max_temporal_id[i]) specifies the temporal identifier (TemporalId) of the highest sublayer representation for which the level information is present in the i-th PTL syntax structure in the VPS. The value of VPS parameter 826 can be in the inclusive range of 0 to VPS parameter 812. When VPS parameter 812 is equal to 0, the value of VPS parameter 826 is inferred to be equal to 0. When VPS parameter 812 is greater than 0 and a corresponding flag (e.g., vps_all_layers_same_num_ sublayers_flag) is equal to 1, the value of VPS parameter 826 is inferred to be equal to VPS parameter 812.

In some embodiments, VPS parameter 828 (vps_ptl_alignment_zero_bit) can be equal to 0. In some embodiments, VPS parameter 830 (ols_ptl_idx[i]) specifies the index, to the list of PTL syntax structures in the VPS, of the PTL syntax structure that applies to the i-th OLS. When present, the value of VPS parameter 830 can be in the inclusive range of 0 to VPS parameter 822. When VPS parameter 828 is equal to 0, the value of VPS parameter 830 is inferred to be equal to 0.

When NumLayersInOls[i], the variable specifying the number of layers in the i-th OLS, is equal to 1, the PTL syntax structure that applies to the i-th OLS is also present in the SPS referred to by the layer in the i-th OLS. In some embodiments, it is a requirement of bitstream conformance that the PTL syntax structures signalled in the VPS and in the SPS for the i-th OLS can be identical when the number of layers in the i-th OLS is equal to 1.

VPS parameter 832 (vps_num_dpb_params) specifies the number of DPB parameters syntax structures in the VPS. In some embodiments, the value of VPS parameter 832 can be in the inclusive range of 0 to 16. When not present, the value of VPS parameter 832 is inferred to be equal to 0.

VPS parameter 834 (vps_sublayer_dpb_params_present_flag) is used to control the presence of syntax elements (e.g., max_dec_pic_buffering_minus1[ ], max_num_reorder_pics[ ], and max_latency_increase_plus1[ ]) in the DPB parameters syntax structures in the VPS. When not present, VPS parameter 834 is inferred to be equal to 0.

VPS parameter 836 (dpb_max_temporal_id[i]) specifies the TemporalId of the highest sublayer representation for which the DPB parameters may be present in the i-th DPB parameters syntax structure in the VPS. The value of VPS parameter 836 can be in the inclusive range of 0 to VPS parameter 812. When VPS parameter 812 is equal to 0, the value of VPS parameter 836 is inferred to be equal to 0. When VPS parameter 812 is greater than 0 and a corresponding flag (e.g., vps_all_layers_same_num_sublayers_flag) is equal to 1, the value of VPS parameter 836 is inferred to be equal to VPS parameter 812.

VPS parameter 838 (ols_dpb_pic_width[i]) and VPS parameter 840 (ols_dpb_pic_height[i]) respectively specify the width and the height, in units of luma samples, of each picture storage buffer for the i-th OLS.

VPS parameter 842 (ols_dpb_params_idx[i]) specifies the index, to the list of DPB parameters syntax structures in the VPS, of the DPB parameters syntax structure that applies to the i-th OLS when NumLayersInOls[i] is greater than 1. When present, the value of VPS parameter 842 can be in the inclusive range of 0 to the value of VPS parameter 832 minus 1. When VPS parameter 842 is not present, the value of VPS parameter 842 is inferred to be equal to 0. In some embodiments, when NumLayersInOls[i] is equal to 1, the DPB parameters syntax structure that applies to the i-th OLS is present in the SPS referred to by the layer in the i-th OLS.

VPS parameter 844 (vps_general_hrd_params_present_flag) equal to 1 specifies that a General HRD parameters syntax structure (e.g., syntax structure 700A in FIG. 7A) and other HRD parameters are present in the VPS RBSP syntax structure. The VPS parameter 844 equal to 0 specifies that the General HRD parameters syntax structure and other HRD parameters are not present in the VPS RBSP syntax structure. When not present, the value of VPS parameter 844 is inferred to be equal to 0. When NumLayersInOls[i] is equal to 1, the General HRD parameters syntax structure that applies to the i-th OLS is present in the SPS referred to by the layer in the i-th OLS.

VPS parameter 846 (vps_sublayer_cpb_params_present_flag) equal to 1 specifies that the i-th OLS HRD parameters syntax structure (e.g., syntax structure 700B in FIG. 7B) in the VPS contains HRD parameters for the sublayer representations with TemporalId in the inclusive range of 0 to the value of VPS parameter 850. VPS parameter 846 equal to 0 specifies that the i-th OLS HRD parameters syntax structure in the VPS contains HRD parameters for the sublayer representation with TemporalId equal to the value of VPS parameter 850 only. When VPS parameter 812 is equal to 0, the value of VPS parameter 846 is inferred to be equal to 0.

When VPS parameter 846 is equal to 0, the HRD parameters for the sublayer representations with TemporalId in the inclusive range of 0 to the value of VPS parameter 850 minus 1 are inferred to be the same as that for the sublayer representation with TemporalId equal to VPS parameter 850. In some embodiments, the HRD parameters include those starting from the fixed_pic_rate_general_flag[i] syntax element till the sublayer_hrd_parameters(i) syntax structure under the condition statement "if(general_vcl_hrd_params_present_flag)" in the OLS HRD parameters syntax structure 700B in FIG. 7B.

VPS parameter 848 (num_ols_hrd_params_minus1) plus 1 specifies the number of OLS HRD parameters syntax structures present in the General HRD parameters syntax structure when VPS parameter 844 is equal to 1. The value of VPS parameter 848 can be in the inclusive range of 0 to the value of TotalNumOlss minus 1.

VPS parameter 850 (hrd_max_tid[i]) specifies the TemporalId of the highest sublayer representation for which the HRD parameters are contained in the i-th OLS HRD parameters syntax structure. The value of VPS parameter 850 can be in the inclusive range of 0 to VPS parameter 812. When VPS parameter 812 is equal to 0, the value of VPS parameter 850 is inferred to be equal to 0. When VPS parameter 812 is greater than 0 and a corresponding flag (e.g., vps_all_layers_same_num_sublayers_flag) is equal to 1, the value of VPS parameter 850 is inferred to be equal to VPS parameter 812.

VPS parameter 852 (ols_hrd_idx[i]) specifies the index, to the list of OLS HRD parameters syntax structures in the VPS, of the OLS HRD parameters syntax structure that applies to the i-th OLS when NumLayersInOls[i] is greater than 1. The value of VPS parameter 852 can be in the inclusive range of 0 to VPS parameter 848. When NumLayersInOls[i] is equal to 1, the OLS HRD parameters syntax structure that applies to the i-th OLS is present in the SPS referred to by the layer in the i-th OLS. In some embodiments, if the value of VPS parameter 848 plus 1 is equal to TotalNumOlss, the value of VPS parameter 852 is inferred to be equal to the index i. In some embodiments, when NumLayersInOls[i] is greater than 1 and VPS parameter 848 is equal to 0, the value of VPS parameter 852 is inferred to be equal to 0.

The PTL parameter syntax structure, the DPB parameter syntax structure, and HRD parameter syntax structures may also be signaled in Sequence Parameter Set (SPS) if the layer of the SPS is an independent layer.

FIG. 9 illustrates an exemplary coding syntax table of a portion of SPS RBSP syntax structure 900 signaled in the SPS, with emphasis in bold, consistent with some embodiments of the disclosure. As shown in FIG. 9, SPS parameter 910 (sps_seq_parameter_set_id) provides an identifier for the SPS for reference by other syntax elements. SPS NAL units, regardless of the nub_layer_id values, share the same value space of SPS parameter 910. Let spsLayerId be the value of the nuh_layer_id of a particular SPS NAL unit, and vclLayerId be the value of the nuh_layer_id of a particular VCL NAL unit. The particular VCL NAL unit cannot refer to the particular SPS NAL unit unless spsLayerId is less than or equal to vclLayerId and the layer with nuh_layer_id equal to spsLayerId is included in at least one OLS that includes the layer with nuh_layer_id equal to vclLayerId.

SPS parameter 912 (sps_video_parameter_set_id) specifies the value of vps_video_parameter_set_id for the VPS referred to by the SPS, when SPS parameter 912 is greater than 0. In some embodiments, when SPS parameter 912 is equal to 0, the corresponding SPS does not refer to a VPS, and no VPS is referred to when decoding each CLVS referring to the SPS. In addition, the value of the corresponding VPS parameter 810 is inferred to be equal to 0, the CVS contains only one layer (i.e., VCL NAL unit in the CVS have the same value of nuh_layer_id), the value of GeneralLayerIdx[nuh_layer_id] is inferred to be equal to 0, and the value of vps_independent_layer_flag[GeneralLayerIdx[nuh_layer_id]] is inferred to be equal to 1. When vps_independent_layer_flag[GeneralLayerIdx[nuh_layer_id]] is equal to 1, the SPS, which is referred to by a CLVS with a particular nuh_layer_id value nuhLayerId, can have the nuh_layer_id equal to nuhLayerId. In some embodiments, the value of SPS parameter 912 can be the same in SPSs that are referred to by CLVSs in a CVS.

SPS parameter 914 (sps_max_sublayers_minus1) plus 1 specifies the maximum number of temporal sublayers that may be present in each CLVS referring to the SPS. The value of SPS parameter 914 can be in the inclusive range of 0 to the corresponding VPS parameter 812.

In some embodiments, SPS parameter 916 (sps_reserved_zero_4bits) can be equal to 0 in bitstreams. Other values for SPS parameter 916 can be reserved for future use.

SPS parameter 918 (sps_ptl_dpb_hrd_params_present_flag) equal to 1 specifies that a PTL syntax structure and a DPB parameters syntax structure are present in the SPS, and a General HRD parameters syntax structure and an OLS HRD parameters syntax structure may also be present in the SPS. SPS parameter 918 equal to 0 specifies that none of these four syntax structures is present in the SPS. The value of SPS parameter 918 can be equal to vps_independent_layer_flag[GeneralLayerIdx[nuh_layer_id]].

SPS parameter 920 (sps_sublayer_dpb_params_flag) is used to control the presence of syntax elements (e.g., max_dec_pic_buffering_minus1[i], max_num_reorder_pics[i], and max_latency_increase_plus1[i]) in the DPB parameters syntax structure in the SPS. When not present, the value of SPS parameter 920 can be inferred to be equal to 0.

SPS parameter 922 (sps_general_hrd_params_present_flag) equal to 1 specifies that the SPS contains a General HRD parameters syntax structure and an OLS HRD parameterssyntax structure. SPS parameter 922 equal to 0 specifies that the SPS does not contain a General HRD parameters syntax structure or an OLS HRD parameterssyntax structure.

SPS parameter 924 (sps_sublayer_cpb_params_present_flag) equal to 1 specifies that the OLS HRD parameterssyntax structure in the SPS includes HRD parameters for sublayer representations with TemporalId in the inclusive range of 0 to SPS parameter 914. SPS parameter 924 equal to 0 specifies that the OLS HRD parameterssyntax structure in the SPS includes HRD parameters for the sublayer representation with TemporalId equal to SPS parameter 914 only. When SPS parameter 914 is equal to 0, the value of SPS parameter 924 is inferred to be equal to 0. When SPS parameter 924 is equal to 0, the HRD parameters for the sublayer representations with TemporalId in the inclusive range of 0 to the value of SPS parameter 914 minus 1 are inferred to be the same as that for the sublayer representation with TemporalId equal to SPS parameter 914. In some embodiments, these HRD parameters include those starting from the fixed_pic_rate_general_flag[i] syntax element till the sublayer_hrd_parameters(i) syntax structure under the condition statement "if(general_vcl_hrd_params_present_flag)" in the OLS HRD parameters syntax structure 700B of FIG. 7B.

For the PTL, DPB and HRD parameters signaling and OLSs signaling in the VPS or the SPS described above, there are several problems.

For example, as shown in FIG. 8, for signaling DPB and HRD parameters, the number of syntax structure (VPS parameter 832 for DPB parameter and VPS parameter 848 for HRD parameter) and the index of the syntax structure applied to the i-th OLS (VPS parameter 842 for DPB parameter and VPS parameter 852 for HRD parameter) are signaled in VPS with "ue(v)" coding method, which is a variable length coding method in which a smaller value is coded with fewer bits and a larger value is coded with more bits. On the other hand, for signaling PTL parameters, the number of syntax structure, VPS parameter 822, and index of syntax structure applied to the i-th OLS, VPS parameter 830, are coded with "u(8)," which is a fixed length coding method using 8 bits for values in the range of 0 to 255.

Therefore, the coding method of syntax structure number and syntax structure index between DPB, HRD and PTL parameters may be different. In addition, often in real applications, the number of PTL syntax structure is relatively small. Using 8 bits for these syntax elements (e.g., VPS parameters 822 and 830) unnecessarily increases signaling overhead.

Moreover, to specify which PTL, DPB and HRD syntax structure is applied to each OLS, an index (e.g., VPS parameters 830, 842, or 852) is signaled in VPS for each OLS. However, if the number of OLS is equal to the number of syntax structures, an efficient encoder can perform a one-to-one mapping from the syntax structure to the OLS and avoid a waste of bits resulted from the unused syntax structure. Thus, the encoder can signal the syntax structures in the order of OLS to which it is applied, without signaling the index. At the decoder side, it can be inferred that the i-th syntax structure is applied to i-th OLS. By skipping the index signaling, the number of the bits can be reduced and the coding efficiency can therefore be improved. In some embodiments, this mechanism is used for HRD parameter. In some embodiments, this mechanism can also be used for PTL and DPB parameters and prevent the increasing signaling overhead or the inconsistency in the signaling design.

Moreover, in the SPS, SPS parameter 920, which is signaled when SPS parameter 914 is larger than 0, controls the presence of syntax elements, including parameters 610B, 620B, and 630B, in the DPB parameters syntax structure 600B in the SPS. The SPS parameter 920. When SPS parameter 918 is equal to 0, the DPB parameters syntax structure is not signaled. Alternatively stated, when SPS parameter 914 is larger than 0 and SPS parameter 918 is equal to 0, the signaling of SPS parameter 920 is redundant.

In addition, in syntax structure 800 of FIG. 8, VPS parameter 818, which is used for specifying the total number of OLSs, is fixed length coded with code length 8. Therefore, the maximum value of VPS parameter 818 is 255. An OLS is defined by VPS parameter 820 for each layer in CVS, and the total number of OLSs is smaller than or equal to the number of combinations of VPS parameter 820. When the maximum number of layers in CVS (i.e., the value of VPS parameter 810 plus 1) is smaller than 8, using 8-bit fixed length coding for VPS parameter 818 may be not necessary.

Figure 10A:
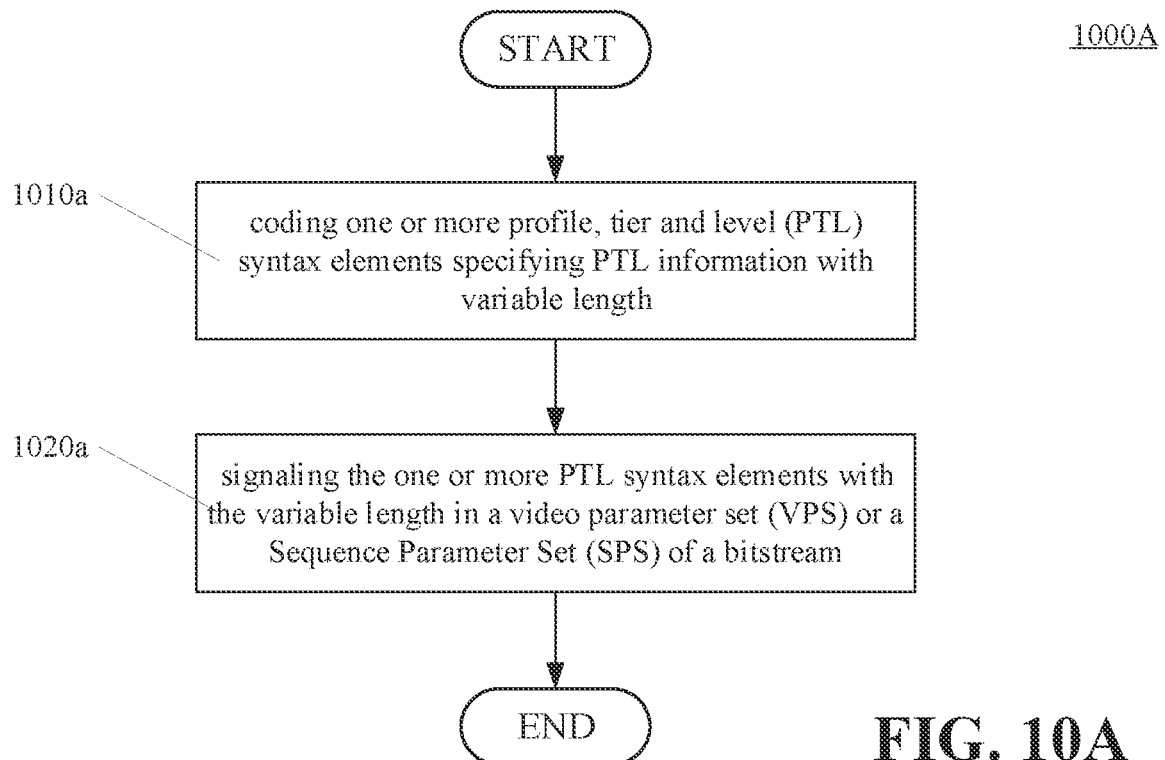
FIG. 10A illustrates a flowchart of an exemplary video encoding method, consistent with some embodiments of the disclosure.

FIG. 10A illustrates a flowchart of an exemplary video encoding method 1000A, consistent with some embodiments of the disclosure. In some embodiments, video encoding method 1000A can be performed by an encoder (e.g., an encoder performing process 200A in FIG. 2A or process 200B in FIG. 2B) to generate bitstream 500 shown in FIG. 5. For example, the encoder can be implemented as one or more software or hardware components of an apparatus (e.g., apparatus 400 in FIG. 4) for encoding or transcoding a video sequence (e.g., video sequence 202 in FIG. 2A or in FIG. 2B) to generate the bitstream (e.g., video bitstream 228 in FIG. 2A or in FIG. 2B) for the video sequence. For example, a processor (e.g., processor 402 in FIG. 4) can perform video encoding method 1000A.

Referring to video encoding method 1000A, at step 1010a, the encoder codes one or more PTL syntax elements (e.g., VPS parameter 822 or VPS parameter 830 in FIG. 8) specifying PTL related information with variable length. At step 1020a, the encoder signals the one or more PTL syntax elements with the variable length in the VPS (e.g., VPS 510 in FIG. 5) or the SPS (e.g., SPS 520 in FIG. 5) of the bitstream (e.g., bitstream 500 in FIG. 5).

Figure 10B:
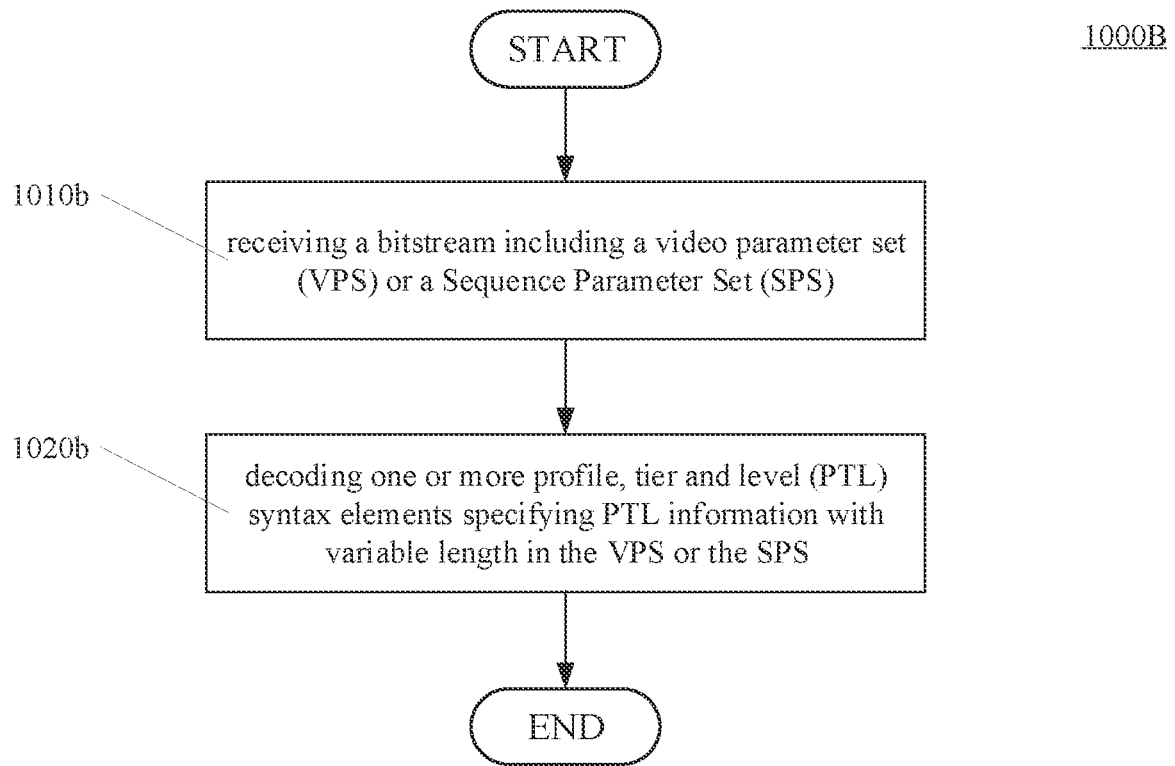
FIG. 10B illustrates a flowchart of an exemplary video decoding method corresponding to the video encoding method of FIG. 10A, consistent with some embodiments of the disclosure.

FIG. 10B illustrates a flowchart of an exemplary video decoding method 1000B corresponding to video encoding method 1000A in FIG. 10A, consistent with some embodiments of the disclosure. In some embodiments, video decoding method 1000B can be performed by a decoder (e.g., a decoder performing decoding process 300A in FIG. 3A or decoding process 300B in FIG. 3B) to decode bitstream 500 in FIG. 5. For example, the decoder can be implemented as one or more software or hardware components of an apparatus (e.g., apparatus 400 in FIG. 4) for decoding the bitstream (e.g., video bitstream 228 in FIG. 3A or FIG. 3D) to reconstruct a video stream (e.g., video stream 304 in FIG. 3A or FIG. 3B) of the bitstream. For example, a processor (e.g., processor 402 in FIG. 4) can perform video decoding method 1000B. Referring to FIG. 10B, in video decoding method 1000B, at step 1010b, the decoder receives a bitstream (e.g., bitstream 500 in FIG. 5) including the VPS or the SPS to be decoded. At step 1020b, the decoder decodes one or more PTL syntax elements specifying PTL related information with variable length in the VPS or the SPS.

FIG. 10C and FIG. 10D illustrate exemplary VPS syntax structures 1000C and 1000D, respectively, consistent with some embodiments of the present disclosure. Each of VPS syntax structures 1000C and 1000D can be used in methods 1000A and 1000B. VPS syntax structures 1000C and 1000D are modified based on syntax structure 800 of FIG. 8.

As shown in FIG. 10C, in some embodiments, the PTL syntax element to be coded or decoded with the variable length may include a first PTL syntax element (e.g., VPS parameter 830) specifying an index of a PTL syntax structure or a second PTL syntax element (e.g., VPS parameter 822) specifying the number of PTL syntax structures in the VPS or the SPS. The first PTL syntax element and the second PTL syntax element can be coded or decoded by using an Exponential-Golomb code. For example, the number of PTL syntax structure (e.g., VPS parameter 822) and the index of PTL syntax structure (e.g. VPS parameter 830) can be coded using the coding method of "ue(v)" which is 0-th order Exp-Golomb code. In terms of design consistency, PTL parameters can be signaled in the same ways as the DPB and HDR parameters by signaling PTL parameters with "ue(v)" coding method. As shown in FIG. 10C, descriptors 822$d$ and 830$d$ respectively indicate that the coding method for VPS parameters 822 and 830 are changed from u(8) to ue(v). The semantics (the left column of the table) shown in syntax structure 1000C of FIG. 10C are not changed and thus are the same as in syntax structure 800 of FIG. 8.

As shown in syntax structure 1000D of FIG. 10D, in some other embodiments, when encoding the first PTL syntax element (e.g., VPS parameter 830), the length of the first PTL syntax element can be set to be a smallest integer greater than or equal to a base-2 logarithm of the number of PTL syntax structures in the VPS or the SPS. In some other embodiments, when encoding the second PTL syntax element (e.g., VPS parameter 822), the length of the second PTL syntax element can be a fixed length, such as u(8).

For example, the index of PTL syntax structure (e.g. VPS parameter 830) can be coded using the coding method of "u(v)" in which the number of bits is not fixed. The bit number depends on the value of other syntax elements, such as a value associated with number of PTL syntax structure (e.g., VPS parameter 822), which is still coded with u(8). Therefore, after parsing the value of VPS parameter 822, the length of VPS parameter 830 is calculated as Ceil(log 2(vps_num_ptls_minus1+1)), where log 2(x) is the base-2 logarithm of x and Ceil(x) is the smallest integer greater than or equal to x, and then VPS parameter 830 is parsed with Ceil(log 2(vps_num_ptls_minus1+1)) bits. In particular, for VPS parameter 830, the coding method can be changed from u(8) to u(v). Similar to the embodiments shown in FIG. 8, when present, the value of VPS parameter 830 can be in the inclusive range of 0 to VPS parameter 822. When VPS parameter 828 is equal to 0, the value of VPS parameter 830 is inferred to be equal to 0.

In some embodiments, when the number of PTL or DPB syntax structures is equal to the number of OLS, the index (e.g., VPS parameters 830 and 842) can be inferred without signaling. By omitting the signaling the index, the signaling cost can be reduced.

Figure 11A:
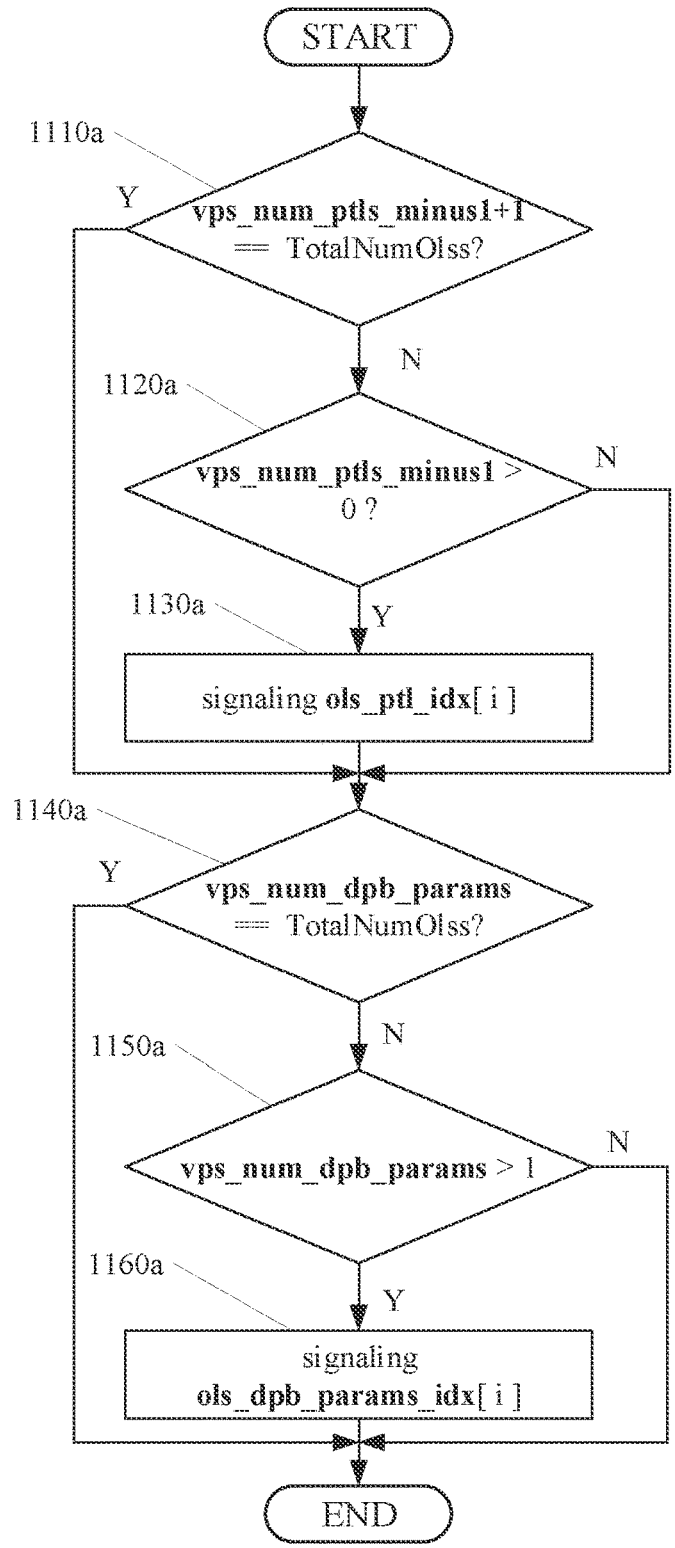
FIG. 11A illustrates a flowchart of an exemplary video encoding method, consistent with some embodiments of the disclosure.
Figure 11B:
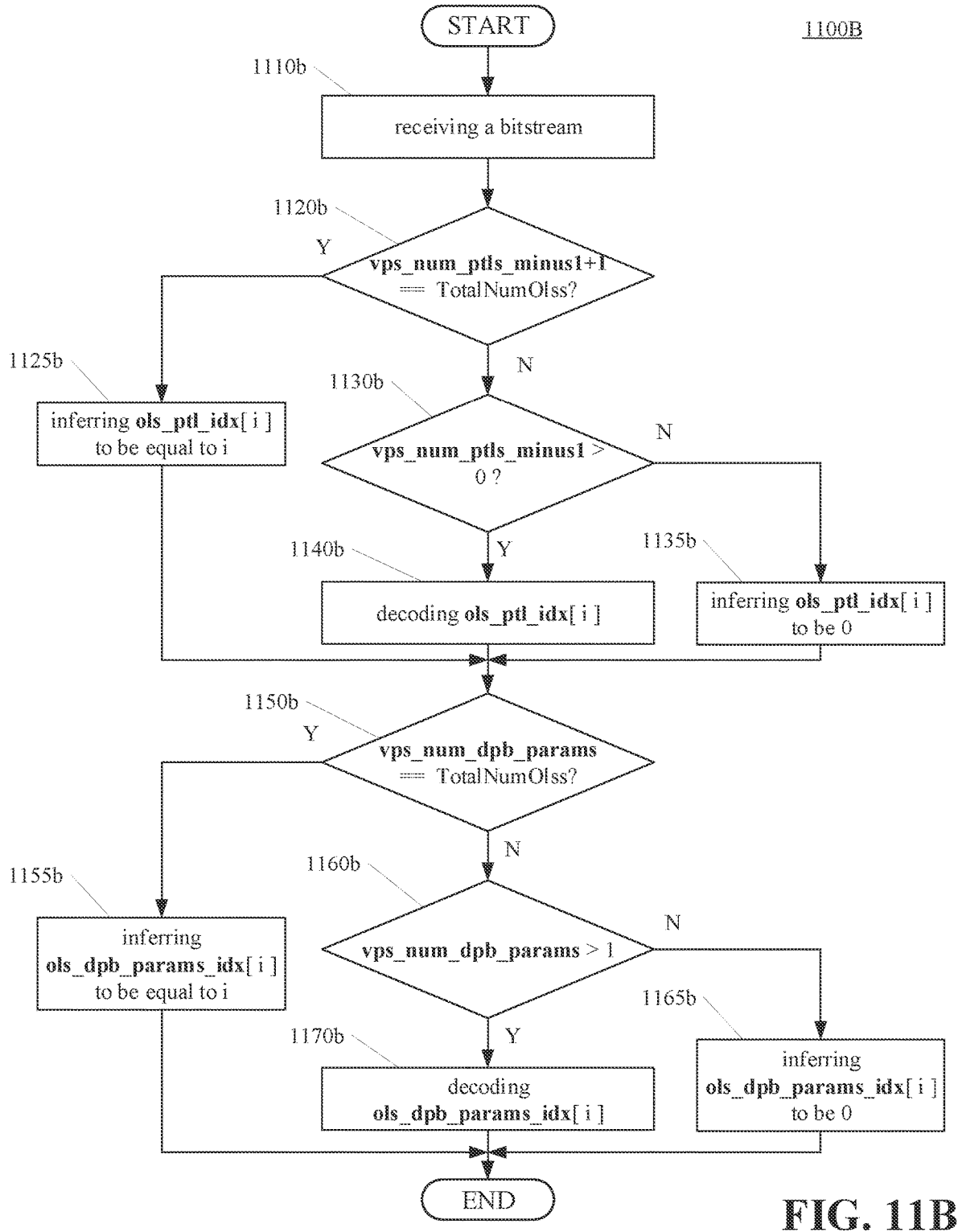
FIG. 11B illustrates a flowchart of an exemplary video decoding method corresponding to the video encoding method of FIG. 11A, consistent with some embodiments of the disclosure.

FIG. 11A illustrates a flowchart of an exemplary video encoding method 1100A, consistent with some embodiments of the disclosure. FIG. 11B illustrates a flowchart of an exemplary video decoding method 1100B corresponding to video encoding method 1100A in FIG. 11A, consistent with some embodiments of the disclosure. Similar to methods 1000A and 1000B in FIG. 10A and FIG. 10B, video encoding method 1100A and video decoding method 1100B can be performed by the encoder and the decoder implemented as one or more software or hardware components (e.g., a processor executing a set of instructions) of the apparatus.

Referring to video encoding method 1100A shown in FIG. 11A, at step 1110$a$, the encoder determines whether the number of PTL syntax structures (vps_num_ptls_minus1+1) and the number of OLSs (TotalNumOlss) in the VPS are the same. In other words, the encoder determines whether a coded video sequence (CVS) contains equal number of PTL syntax structures and OLSs.

In response to the CVS containing equal number of PTL syntax structures and OLSs (step 1110$a$—Yes), the encoder bypasses steps 1120$a$ and 1130$a$ and codes the bitstream without signaling a first PTL syntax element (e.g., ols_ptl_idx[i]) specifying an index, to a list of PTL syntax structure in the VPS, of a PTL syntax structure applies to the i-th OLS.

In response to the number of PTL syntax structures being different to the number of the OLSs (step 1110$a$—No), at step 1120$a$, the encoder determines whether the number of PTL syntax structures is equal to one (e.g., by determining whether the parameter vps_num_ptls_minus1 is greater than zero). In response to the number of PTL syntax structures being less than or equal to one (step 1120$a$—No), the encoder bypasses step 1130$a$ and codes the bitstream without signaling the first PTL syntax element in the VPS.

In response to the number of PTL syntax structures being greater than one and different from the number of the OLSs (step 1110$a$—No, step 1120$a$—Yes), the encoder performs step 1130$a$, and signals the first PTL syntax element in the VPS (or the SPS). In some embodiments, the first PTL syntax element is signaled with a fixed length.

In some other embodiments, step 1120$a$ is performed before step 1110$a$. In response to the number of PTL syntax structures being greater than one and different from the number of the OLSs (step 1120$a$—Yes, step 1110$a$—No), step 1130$a$ is performed, otherwise step 1130$a$ is skipped. For example, in response to the number of PTL syntax structures being equal to one (step 1120$a$—No), the encoder may bypass both steps 1110$a$ and 1130$a$.

Similar to the coding of the PTL syntax elements, the coding of the index (e.g., VPS parameter 842) for the DPB syntax elements can be inferred without signaling when certain conditions are met.

At step 1140$a$, the encoder determines whether the number of DPB parameter syntax structures (vps_num_dpb_params) and the number of OLSs (TotalNumOlss) in the VPS are the same. In other words, the encoder determines whether the coded video sequence (CVS) contains equal number of DPB parameter syntax structures and OLSs.

In response to the number of DPB parameter syntax structures being the same as the number of the OLSs (step 1140$a$—Yes), the encoder bypasses steps 1150$a$ and 1160$a$ and codes the bitstream without signaling a first DPB syntax element (e.g., ols_dpb_params_idx[i]) specifying an index, to a list of DPB parameter syntax structures in the VPS, of the DPB parameter syntax structure that applies to the i-th OLS.

In response to the number of DPB parameter syntax structures being different to the number of the OLSs (step 1140$a$—No), at step 1150$a$, the encoder determines whether the number of DPB parameter syntax structures is equal to one (e.g., by determining whether the parameter vps_num_dpb_params is greater than 1). In response to the number of DPB parameter syntax structures being less than or equal to one (step 1150$a$—No), the encoder bypasses step 1160$a$ and codes the bitstream without signaling the first DPB syntax element.

In response to the number of DPB parameter syntax structures being greater than one and different from the number of the OLSs (step 1140$a$—No, step 1150$a$—Yes), the encoder performs step 1160$a$, and signals the first DPB syntax element in the VPS. In some embodiments, the first DPB syntax element is signaled with a variable length using ue(v).

In some embodiments, step 1150*a* is performed before step 1140*a*. In response to the number of DPB syntax structures being greater than one and different from the number of the OLSs (step 1150*a*—Yes, step 1140*a*—No), step 1160*a* is performed, otherwise step 1160*a* is skipped. For example, in response to the number of DPB syntax structures being equal to one (step 1150*a*—No), the encoder may bypass both steps 1140*a* and 1160*a*.

Referring to video decoding method 1100B shown in FIG. 11B, on the decoder side, at step 1110*b*, the decoder receives a bitstream (e.g., video bitstream 500 in FIG. 5) including coded video sequence (CVS). At step 1120*b*, the decoder determines whether the number of PTL syntax structures (vps_num_ptls_minus1+1) and the number of OLSs (TotalNumOlss) in the VPS are the same. In some embodiments, the decoder decodes one or more VPS syntax elements associated with the OLSs to obtain the information of the number of OLSs (TotalNumOlss).

In response to the number of PTL syntax structures being the same as the number of the OLSs (step 1120*b*—Yes), at step 1125*b*, the decoder infers a first PTL syntax element (e.g., ols_ptl_idx[i]) specifying an index, to a list of PTL syntax structure in the VPS, of a PTL syntax structure that applies to i-th OLS to be equal to a sequential number (e.g., the index i) of the i-th OLS. In response to the number of PTL syntax structures being different to the number of the OLSs (step 1120*b*—No), at step 1130*b*, the decoder determines whether the number of PTL syntax structures is equal to one (e.g., by determining whether the parameter vps_num_ptls_minus1 is greater than zero). In response to the number of PTL syntax structures being less than or equal to one (step 1130*b*—No), at step 1135*b*, the decoder infers the first PTL syntax element to be zero.

In response to the number of PTL syntax structures being greater than one and different from the number of the OLSs (step 1120*b*—No, step 1130*b*—Yes), the decoder performs step 1140*b*, and decodes the first PTL syntax element coded in the VPS or the SPS. In some embodiments, the first PTL syntax element is signaled in the VPS or the SPS with a fixed length.

In some embodiments, step 1130*b* is performed before step 1120*b*. In response to the number of PTL syntax structures being greater than one and different from the number of the OLSs (step 1130*b*—Yes, step 1120*b*—No), step 1140*a* is performed, otherwise step 1140*a* is skipped.

Similarly, at step 1150*b*, the decoder determines whether the number of DPB parameter syntax structures (vps_num_dpb_params) and the number of OLSs (TotalNumOlss) in the VPS are the same.

In response to the number of DPB parameter syntax structures being the same as the number of the OLSs (step 1150*b*—Yes), at step 1155*b*, the decoder infers a first DPB syntax element (e.g., ols_dpb_params_idx[i]) specifying an index of, to a list of DPB parameter syntax structures in the VPS, of a DPB parameter syntax structure that applies to i-thOLS to be equal to a sequential number (e.g., the index i) of the i-th OLS.

In response to the number of DPB parameter syntax structures being different to the number of the OLSs (step 1150*b*—No), at step 1160*b*, the decoder determines whether the number of DPB parameter syntax structures is equal to one (e.g., by determining whether the parameter vps_num_dpb_params is greater than 1). In response to the number of DPB parameter syntax structures being less than or equal to one (step 1160*b*—No), at step 1165*b*, the decoder infers the first DPB syntax element to be zero.

In response to the number of DPB parameter syntax structures being greater than one and different from the number of the OLSs (step 1150*b*—No, step 1160*b*—Yes), the decoder performs step 1170*b*, and decodes the first DPB syntax element in the VPS. In some embodiments, the first DPB syntax element is signaled with a variable length using ue(v).

In some embodiments, step 1160*b* is performed before step 1150*b*. In response to the number of DPB parameter syntax structures being greater than one and different from the number of the OLSs (step 1160*b*—Yes, step 1150*b*—No), step 1170*b* is performed, otherwise step 1170*b* is skipped.

FIG. 11C illustrates a portion of an exemplary VPS syntax structure 1100C associated with a possible implementation of proposed methods 1100A and 1100B, consistent with some embodiments of the present disclosure. VPS syntax structure 1100C in FIG. 11C is modified based on syntax structure 800 of FIG. 8.

Compared to the embodiments shown in FIG. 8, as shown in a condition statement 1110*c* of VPS syntax structure 1100C, VPS parameter 830 is signaled when the value of VPS parameter 822 (vps_num_ptls_minus1) plus 1 is not equal to the total number of OLSs specified by the VPS (TotalNumOlss) and not equal to 0. If the value of VPS parameter 822 plus 1 is equal to TotalNumOlss, the value of VPS parameter 830 is inferred to be equal to the index i. When VPS parameter 822 is equal to 0, the value of VPS parameter 830 is inferred to be equal to 0.

Similarly, as shown in a condition statement 1120*c* of VPS syntax structure 1100C, VPS parameter 842 (ols_dpb_params_idx[i]) is signaled when the value of VPS parameter 832 is not equal to TotalNumOlss and not equal to 0. When VPS parameter 842 is not signaled, the value of VPS parameter 842 is inferred to be the index i if the value of the VPS parameter 832 is equal to TotalNumOlss. When VPS parameter 832 is equal to 0, the value of VPS parameter 842 is inferred to be equal to 0.

As explained above, during the encoding or the decoding process, the encoder or the decoder may need to determine the number of OLSs (TotalNumOlss) in the VPS. In some embodiments, the decoder and encoder can derive the number of OLSs according to an OLS mode indicated by a VPS syntax element (e.g., VPS parameter 816) and maximum number of layers in CVS indicated by another VPS syntax element (e.g., VPS parameter 810). In some embodiments, the encoder can encode a VPS syntax element (e.g., VPS parameter 818) with the fixed length being associated with the number of OLSs specified by the VPS, and the decoder can decode the VPS syntax element with the fixed length to determine the number of OLSs specified by the VPS. In some embodiments, the encoder can encode a VPS syntax element (e.g., VPS parameter 818) with the variable length being associated with the number of OLSs contained in the CVS referring to the VPS, and the decoder can decode the VPS syntax element with the variable length to determine the number of OLSs contained in the CVS referring to the VPS. The length of the VPS syntax element can be equal to a maximum allowed number of layer combinations in a CVS referring to the VPS when the maximum allowed number is smaller than a predefined length value.

FIG. 11D illustrates a portion of an exemplary VPS syntax structure 1100D modified based on syntax structure 800 of FIG. 8 and associated with a possible implementation of encoding or decoding the VPS syntax element with the variable length, consistent with some embodiments of the present disclosure. In some cases, the total number of OLSs is limited by the number of combinations of VPS parameter 820 (ols_output_layer_flag) of all layers in the CVS, and TotalNumOlss satisfies the following in equation:

$$\text{TotalNumOlss} \leq 2^{vps\_max\_layers\_minus1+1}$$

VPS parameter 818 plus 1 specifies the total number of OLSs specified by the VPS when VPS parameter 816 is equal to 2. Therefore, VPS parameter 818 can be represented in (vps_max_layers_minus1+1) bits (e.g., the value of VPS parameter 810 plus 1).

In some embodiments, as shown in FIG. 11D, descriptor 818d, highlighted in italics, indicates that the coding method for VPS parameter 818 can be a variable length coding, where the length of VPS parameter 818 is a predefined value (e.g., 8), or the value of VPS parameter 810 plus 1 (i.e., the maximum allowed number of layers in a CVS referring to the VPS), whichever is smaller. For example, in some embodiments, the length of VPS parameter 818 can be determined based on the following min function:

$$\text{Min}(8, vps\_max\_layers\_minus1+1)$$

Reference is made again to FIG. 9. As explained above, the value of SPS parameter 914 can be in the inclusive range of 0 to the corresponding VPS parameter 812. In some embodiments, when SPS parameter 912 is equal to 0, the SPS does not refer to a VPS and thus there is no corresponding VPS parameter 812, so the range of SPS parameter 914 is undefined. The syntax can be modified to solve this issue by assigning the range of the value of SPS parameter 914 being independent to VPS parameter 812 when SPS parameter 912 (sps_video_parameter_set_id) is equal to 0.

Figure 12A:
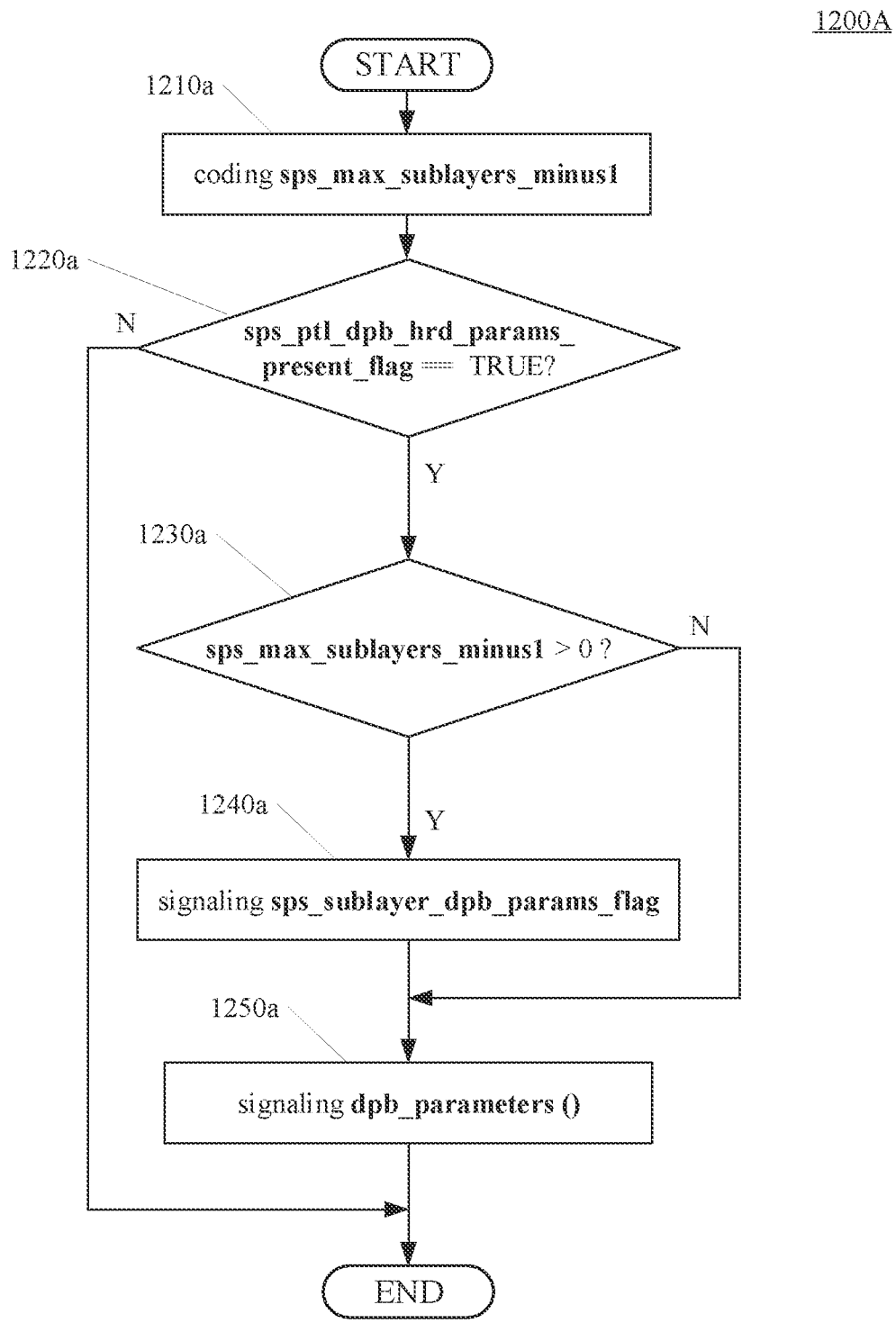
FIG. 12A illustrates a flowchart of an exemplary video encoding method, consistent with some embodiments of the disclosure.
Figure 12B:
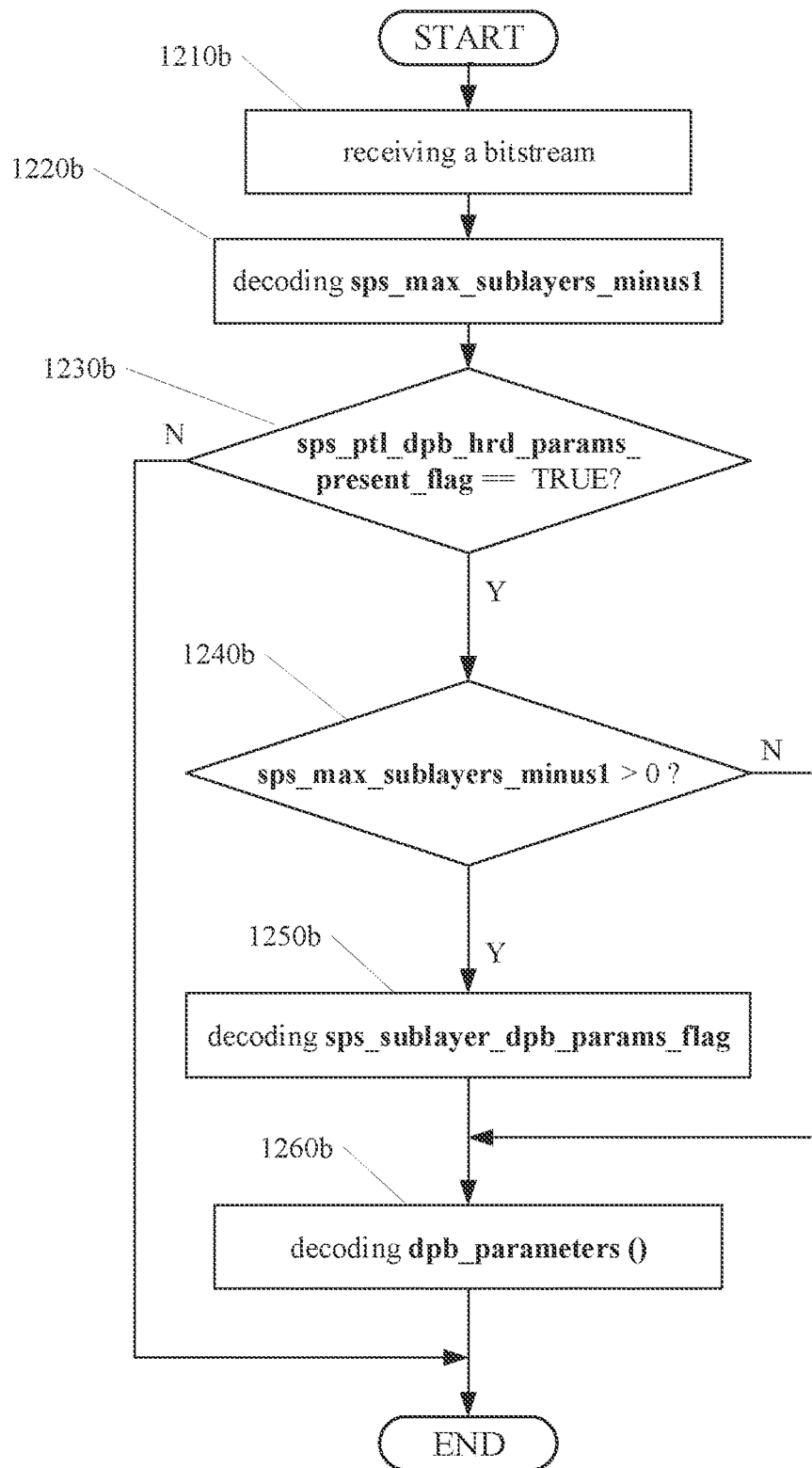
FIG. 12B illustrates a flowchart of an exemplary video decoding method corresponding to the video encoding method of FIG. 12A, consistent with some embodiments of the disclosure.

FIG. 12A illustrates a flowchart of an exemplary video encoding method 1200A, consistent with some embodiments of the disclosure. FIG. 12B illustrates a flowchart of an exemplary video decoding method 1200B corresponding to video encoding method 1200A in FIG. 12A, consistent with some embodiments of the disclosure. Similar to methods 1000A and 1000B in FIG. 10A and FIG. 10B, video encoding method 1200A and video decoding method 1200B can be performed by the encoder and the decoder implemented as one or more software or hardware components (e.g., a processor executing a set of instructions) of the apparatus.

Referring to video encoding method 1200A shown in FIG. 12A, at step 1210a, the encoder codes a first SPS syntax element (e.g., SPS parameter 914 sps_max_sublayers_minus1) associated with the maximum number of temporal sublayers that may be present in each CLVS referring to the SPS. At step 1220a, the encoder determines whether a PTL syntax structure, a DPB parameters syntax structure, and/or an HRD parameters syntax structure present in the SPS. For example, the encoder can make the determination and then set the value of SPS parameter 918 (sps_ptl_dpb_hrd_params_present_flag) based on the determination. If the determination is true (step 1220a—Yes), the encoder performs step 1230a, and determines whether the maximum number of temporal sublayers present in each coded layer video sequence (CLVS) referring to the SPS is greater than one by determining whether the SPS parameter 914 is greater than zero.

When both conditions are satisfied (step 1220a—Yes, step 1230a—Yes), at step 1240a, the encoder signals a flag (e.g., SPS parameter 920, sps_sublayer_dpb_params_flag) configured to control the presence of syntax elements in the DPB parameters syntax structure in the SPS. Then, the encoder performs step 1250a to signal one or more syntax elements in the DPB parameters syntax structure.

When the maximum number of the temporal sublayers is equal to or smaller than one (step 1220a—Yes, step 1230a— No), the encoder bypasses step 1240a and performs step 1250a to signal one or more syntax elements in the DPB parameters syntax structure by setting the flag (e.g., SPS parameter 920, sps_sublayer_dpb_params_flag) equal to 0 but without signaling the flag.

If none of the PTL syntax structure, the DPB parameters syntax structure, and the HRD parameters syntax structure present in the SPS (step 1220a—No), the encoder bypasses steps 1230a-1250a and codes the SPS without signaling the flag (e.g., SPS parameter 920, sps_sublayer_dpb_params_flag) and DPB syntax elements.

In some embodiments, for the coding of SPS parameter 914 in video encoding method 1200A, the range of SPS parameter 914 (sps_max_sublayers_minus1) can be set to be the same as that of VPS parameter 812 (vps_max_sublayers_minus1) when the SPS refers to a VPS. When the SPS does not refer to a VPS and consequently corresponding VPS parameter 812 (vps_max_sublayers_minus1) does not exist, the range of SPS parameter 914 can still be defined by setting a predefined value. For example, the value of VPS parameter 812 can be in range of 0 to a predefined static value (e.g., 6) Thus, the value of SPS parameter 914 can be in the inclusive range of 0 to MaxSubLayer minus 1, in which the value of the parameter MaxSubLayer can be derived and computed from the codes using a ternary operator as follows:

$$\text{MaxSubLayer} = (sps\_video\_parameter\_set\_id = 0?6: vps\_max\_sublayers\_minus1) + 1$$

Alternatively stated, the encoder may first determine a value of SPS parameter 912, which specifies an identifier of the VPS referred to by the SPS when the value of SPS parameter 912 is greater than zero and indicates SPS does not refer to a VPS when the value of SPS parameter 912 is equal to zero. Then, in response to the value of SPS parameter 912 is greater than zero, the encoder assigns a range of SPS parameter 914, which specifies the maximum number of temporal sublayers present in each CLVS referring to the SPS, based on a corresponding VPS parameter 812. That is, the value of SPS parameter 914 (e.g., sps_max_sublayers_minus1) is in the range of 0 to VPS parameter 812 (e.g., vps_max_sublayers_minus1), inclusive. On the other hand, in response to the value of SPS parameter 912 being equal to zero, the encoder assigns a range of SPS parameter 914 to be an inclusive range of zero to a fixed value (e.g., 6). That is, the value of SPS parameter 914 (e.g., sps_max_sublayers_minus1) is in the range of 0 to 6, inclusive.

Accordingly, an inferred value can be given to SPS parameter 914 when the SPS parameter 912 is equal to 0. Therefore, the maximum value of SPS parameter 914 is available when SPS does not refer to any VPS. In some embodiments, the semantic can be changed so that, when SPS parameter 912 is equal to 0, the value of VPS parameter 812 (vps_max_sublayers_minus1) is inferred to be equal to a predefined static value (e.g., 6).

Referring to video decoding method 1200B shown in FIG. 12B, on the decoder side, at step 1210b, the decoder receives a bitstream (e.g., video bitstream 500 in FIG. 5) including the SPS to be decoded. At step 1220b, the decoder decodes a first SPS syntax element (e.g., SPS parameter 914 sps_max_sublayers_minus1). In some embodiments, at the decoder side, when decoding the SPS, the decoder may first determine a value of SPS parameter 912, and then decode SPS parameter 914. The range of SPS parameter 914 is based on a corresponding VPS parameter 812 of the VPS referred to by the SPS when the value of SPS parameter 912 is greater than zero, or being based on a fixed value when the value of SPS parameter 912 is equal to zero.

At step 1230*b*, the decoder determines whether a PTL syntax structure, a DPB parameters syntax structure, and/or an HRD parameters syntax structure present in the SPS. For example, the decoder can make the determination based on whether SPS parameter 918 (sps_ptl_dpb_hrd_params_present_flag) is equal to 1. If the determination is true (step 1230*b*—Yes), the decoder performs step 1240*b*, and determines whether the maximum number of temporal sublayers present in each coded layer video sequence (CLVS) referring to the SPS is greater than one by determining whether the SPS parameter 914 is greater than zero.

When both conditions are satisfied (step 1230*b*—Yes, step 1240*b*—Yes), at step 1250*b*, the decoder decodes the flag (e.g., SPS parameter 920, sps_sublayer_dpb_params_flag) which is signaled is the SPS and configured to control the presence of syntax elements in the DPB parameters syntax structure. Then, the decoder performs step 1260*b* to decode one or more syntax elements in the DPB parameters syntax structure based on the value of the flag (e.g., SPS parameter 920, sps_sublayer_dpb_params_flag).

When the maximum number of the temporal sublayers is equal to or smaller than one (step 1230*b*—Yes, step 1240*b*—No), the decoder bypasses step 1250*b* and infers the flag (e.g., SPS parameter 920, sps_sublayer_dpb_params_flag) to be equal to zero and then performs step 1260*b* to decode one or more syntax elements in the DPB parameters syntax structure based on the value of the flag (e.g., SPS parameter 920, sps_sublayer_dpb_params_flag).

If none of the PTL syntax structure, the DPB parameters syntax structure, and the HRD parameters syntax structure present in the SPS (step 1230*b*—No), the decoder bypasses steps 1240*b*-1260*b* and decodes the SPS without decoding the flag and DPB syntax elements.

FIG. 12C illustrates a portion of an exemplary SPS syntax structure 1200C associated with a possible implementation of proposed methods 1200A and 1200B, consistent with some embodiments of the present disclosure. SPS syntax structure 1200C in FIG. 12C can be modified based on syntax structure 900 of FIG. 9. As explained above, in some embodiments, the signal of SPS parameter 920 can be conditioned on both SPS parameter 918 and SPS parameter 914. Therefore, as shown in FIG. 12C, the syntax element SPS parameter 920 can be signaled (or decoded) under the condition of SPS parameter 918 being equal to 1 and SPS parameter 914 being larger than 0. Otherwise, SPS parameter 920 is not signaled (or decoded).

In view of above, as proposed in various embodiments of the present disclosure, by applying coding or decoding PTL syntax elements using variable length, the coding method of syntax structure number and syntax structure index between DPB, HRD and PTL parameters can be consistent and efficient, and the signaling overhead resulted by using fixed length for these syntax elements can be reduced. In addition, by properly inferring the values of syntax elements when the syntax elements are not signaled, the index signaling can be skipped for some cases, which reduces the number of the output bits and therefore improves the coding efficiency. This method can be used for HRD parameter as well as for PTL and DPB parameters to reduce the signaling overhead and guarantee the consistency in the signaling design.

The embodiments may further be described using the following clauses:

1. A computer-implemented method for encoding video, comprising:
   determining whether a coded video sequence (CVS) contains equal number of profile, tier and level (PTL) syntax structures and output layer sets (OLSs); and
   in response to the CVS containing equal number of PTL syntax structures and OLSs, coding the bitstream without signaling a first PTL syntax element specifying an index, to a list of PTL syntax structures in the VPS, of a PTL syntax structure that applies to a corresponding OLS in the VPS.

2. The method according to clause 1, further comprising:
   determining whether the number of PTL syntax structures being equal to one; and
   in response to the number of PTL syntax structures being equal to one, coding the bitstream without signaling the first PTL syntax element in the VPS.

3. The method according to clause 1, further comprising:
   in response to the number of PTL syntax structures being greater than one and different from the number of the OLSs, signaling, in the VPS, the first PTL syntax element with a fixed length.

4. A computer-implemented method for encoding video, comprising:
   determining whether a coded video sequence (CVS) has equal number of decoded picture buffer (DPB) parameter syntax structures and output layer sets (OLSs); and
   in response to the CVS having equal number of DPB parameter syntax structures and OLSs, coding the bitstream without signaling a first DPB syntax element specifying an index, to a list of DPB parameter syntax structures in the VPS, of a DPB parameter syntax structure that applies to a corresponding OLS.

5. The method according to clause 4, further comprising:
   determining whether the number of DPB parameter syntax structures is less than or equal to one; and
   in response to the number of DPB parameter syntax structures being equal to one, coding the bitstream without signaling the first DPB syntax element in the VPS.

6. The method according to clause 4, further comprising:
   in response to the number of DPB parameter syntax structures being greater than one and different from the number of the OLSs, signaling, in the VPS, the first DPB syntax element with a variable length.

7. A computer-implemented method for encoding video, comprising:
   determining whether at least one of a profile, tier and level (PTL) syntax structure, a decoded picture buffer (DPB) parameters syntax structure, or a hypothetical reference decoder (HRD) parameters syntax structure is present in a Sequence Parameter Set (SPS) of a bitstream;
   determining whether a first value is greater than one, the first value specifying a maximum number of temporal sublayers present in a coded layer video sequence (CLVS) referring to the SPS; and
   when at least one of the PTL syntax structure, the DPB parameters syntax structure, or the HRD parameters syntax structure is present in the SPS and the first value is greater than one, signaling a flag configured to control a presence of syntax elements in the DPB parameters syntax structure in the SPS.

8. The method of clause 7, further comprising:
when the first value is equal to or smaller than one, signaling one or more syntax elements in the DPB parameters syntax structure, without signaling the flag in the SPS.

9. A computer-implemented method for encoding video, comprising:
determining a value of a first Sequence Parameter Set (SPS) syntax element, the first SPS syntax element specifying an identifier of a video parameter set (VPS) referred to by the SPS when the value of the first SPS syntax element is greater than zero;
in response to the value of the first SPS syntax element is greater than zero, assigning a range of a second SPS syntax element specifying a maximum number of temporal sublayers present in each coded layer video sequence (CLVS) referring to the SPS based on a corresponding VPS syntax element; and
in response to the value of the first SPS syntax element equal to zero, assigning the range of the second SPS syntax element specifying the maximum number of temporal sublayers present in each CLVS referring to the SPS to be an inclusive range of zero to a fixed value.

10. A computer-implemented method for encoding video, comprising:
coding one or more profile, tier and level (PTL) syntax elements specifying PTL related information; and
signaling the one or more PTL syntax elements with the variable length in a video parameter set (VPS) or a Sequence Parameter Set (SPS) of a bitstream.

11. The method of clause 10, wherein coding the one or more PTL syntax elements comprises:
coding a first PTL syntax element with the variable length, the first PTL syntax element specifying an index of a PTL syntax structure.

12. The method of clause 11, wherein the VPS or the SPS comprises N PTL syntax structures, N being an integer, and coding the one or more PTL syntax elements further comprises:
setting a length of the first PTL syntax element to be a smallest integer greater than or equal to a base-2 logarithm of N.

13. The method of clause 11, wherein coding the one or more PTL syntax elements comprises:
coding the first PTL syntax element by using an Exponential-Golomb code.

14. The method of clause 10, wherein the VPS or the SPS comprises N PTL syntax structures, N being an integer, and coding the one or more PTL syntax elements comprises:
coding a second PTL syntax element with the variable length, the second PTL syntax element specifying the N.

15. A computer-implemented method for encoding video, comprising:
coding a video parameter set (VPS) syntax element with variable length; and
signaling, in a VPS, the VPS syntax element, the VPS syntax element being associated with the number of output layer sets (OLSs) contained in a coded video sequence (CVS) referring to the VPS.

16. The method according to clause 15, further comprising:
setting a length of the VPS syntax element to be equal to a maximum allowed number of layers in the coded video sequence (CVS) referring to the VPS, when the maximum allowed number is smaller than a predefined length value.

17. A computer-implemented method for decoding video, comprising:
receiving a bitstream comprising a coded video sequence (CVS);
determining whether the CVS has equal number of profile, tier and level (PTL) syntax structures and output layer sets (OLSs); and
in response to the number of PTL syntax structures being equal to the number of the OLSs, skipping decoding a first PTL syntax element specifying an index, to a list of PTL syntax structures in the VPS, of a PTL syntax structure that applies to a corresponding OLS when decoding the VPS.

18. The method according to clause 17, further comprising:
in response to the number of PTL syntax structures being equal to the number of the OLSs, determining the first PTL syntax element to be equal to an index of the OLS to which the PTL syntax structure specified by the first PTL syntax element applies.

19. The method according to clause 17, further comprising:
determining whether the number of PTL syntax structures being equal to one; and
in response the number of PTL syntax structures being equal to one, skipping decoding the first PTL syntax element when decoding the VPS.

20. The method according to clause 19, further comprising:
in response to the number of PTL syntax structures being equal to one, determining the first PTL syntax element to be zero.

21. The method according to clause 17, further comprising:
in response to the number of PTL syntax structures being greater than one and different from the number of the OLSs, decoding the first PTL syntax element with a fixed length in the VPS.

22. A computer-implemented method for decoding video, comprising:
receiving a bitstream comprising a coded video sequence (CVS);
determining whether the CVS has equal number of decoded picture buffer (DPB) parameter syntax structures and output layer sets (OLSs); and
in response to the CVS having equal number of DPB parameter syntax structures and OLSs, skipping decoding a first DPB syntax element specifying an index, to a list of DPB parameter syntax structures in the VPS, of an DPB parameter syntax structure that applies to a corresponding OLS.

23. The method according to clause 22, further comprising:
determining whether the number of DPB parameter syntax structures is less than or equal to one; and
in response to the number of DPB parameter syntax structures is less than or equal to one, skipping decoding the first DPB syntax element when decoding the VPS.

24. The method according to clause 23, further comprising:
in response to the number of DPB parameter syntax structures being less than or equal to one, determining the first DPB syntax element to be zero; and in response to the number of DPB syntax structures being equal to the number of the OLSs, determining the first DPB syntax element to be equal to an index of the OLS to which the DPB parameter syntax structure specified by the first DPB syntax element applies.

25. The method according to clause 23, further comprising:
in response to the number of DPB parameter syntax structures being greater than one and different from the number of the OLSs, decoding the first DPB syntax element with a variable length in the VPS.

26. A computer-implemented method for decoding video, comprising:
receiving a bitstream comprising a video parameter set (VPS) and a Sequence Parameter Set (SPS);
in response to at least one of a profile, tier and level (PTL) syntax structure, a decoded picture buffer (DPB) parameters syntax structure, or a hypothetical reference decoder (HRD) parameters syntax structure being present in the SPS, determining whether a first value specifying a maximum number of temporal sublayers being present in each coded layer video sequence (CLVS) referring to the SPS is greater than one; and
in response to the first value being greater than one, decoding a flag configured to control a presence of syntax elements in the DPB parameters syntax structure in the SPS.

27. The method of clause 26, further comprising:
in response to the first value being equal to or smaller than one, inferring the flag equal to zero and decoding one or more syntax elements in the DPB parameters syntax structure without decoding the flag in the SPS.

28. A computer-implemented method for decoding video, comprising:
determining a value of a first Sequence Parameter Set (SPS) syntax element, the first SPS syntax element specifying an identifier of a video parameter set (VPS) referred to by a SPS when the value of the first SPS syntax element is greater than zero; and
decoding a second SPS syntax element specifying a maximum number of temporal sublayers present in each coded layer video sequence (CLVS) referring to the SPS, a range of the second SPS syntax element being based on a corresponding VPS syntax element of the VPS referred to by the SPS when the value of the first SPS syntax element is greater than zero, or being based on a fixed value when the value of the first SPS syntax element is equal to zero.

29. A computer-implemented method for decoding video, comprising:
receiving a bitstream comprising a video parameter set (VPS) or a Sequence Parameter Set (SPS); and
decoding one or more profile, tier and level (PTL) syntax elements in the VPS or the SPS, the one or more PTL syntax elements specifying PTL related information.

30. The method of clause 29, wherein decoding the one or more PTL syntax elements comprises:
decoding a first PTL syntax element with the variable length, the first PTL syntax element specifying an index of a PTL syntax structure.

31. The method of clause 30, wherein the VPS or the SPS comprises N PTL syntax structures, N being an integer, and a length of the first PTL syntax element is a smallest integer greater than or equal to a base-2 logarithm of N.

32. The method of clause 30, wherein the first PTL syntax element is coded by using an Exponential-Golomb code.

33. The method of clause 29, wherein the VPS or the SPS comprises N PTL syntax structures, N being an integer, and decoding the one or more PTL syntax elements comprises:
decoding a second PTL syntax element with the variable length, the second PTL syntax element specifying the N.

34. A computer-implemented method for decoding video, comprising:
receiving a bitstream comprising a video parameter set (VPS); and
decoding a VPS syntax element with a variable length in the VPS, the VPS syntax element being associated with the number of output layer sets (OLSs) contained in a coded video sequence (CVS) referring to the VPS.

35. The method according to clause 34, wherein a length of the VPS syntax element is equal to a maximum allowed number of layers in the coded video sequence (CVS) referring to the VPS, when the maximum allowed number is smaller than a predefined length value.

36. An apparatus, comprising:
a memory configured to store instructions; and
a processor coupled to the memory and configured to execute the instructions to cause the apparatus to:
determine whether a coded video sequence (CVS) contains equal number of profile, tier and level (PTL) syntax structures and output layer sets (OLSs); and
in response to the CVS containing equal number of PTL syntax structures and OLSs, code the bitstream without signaling a first PTL syntax element specifying an index, to a list of PTL syntax structures in the VPS, of a PTL syntax structure that applies to a corresponding OLS in the VPS.

37. The apparatus of clause 36, wherein the processor is configured to execute the instructions to:
determine whether the number of PTL syntax structures being equal to one; and
in response to the number of PTL syntax structures being equal to one, code the bitstream without signaling the first PTL syntax element in the VPS.

38. The apparatus of clause 36, wherein the processor is configured to execute the instructions to:
in response to the number of PTL syntax structures being greater than one and different from the number of the OLSs, signal, in the VPS, the first PTL syntax element with a fixed length.

39. An apparatus, comprising:
a memory configured to store instructions; and
a processor coupled to the memory and configured to execute the instructions to cause the apparatus to:
determine whether a coded video sequence (CVS) has equal number of decoded picture buffer (DPB) parameter syntax structures and output layer sets (OLSs); and
in response to the CVS having equal number of DPB parameter syntax structures and OLSs, code the bitstream without signaling a first DPB syntax element specifying an index, to a list of DPB parameter syntax structures in the VPS, of a DPB parameter syntax structure that applies to a corresponding OLS.

40. The apparatus of clause 39, wherein the processor is configured to execute the instructions to:
determine whether the number of DPB parameter syntax structures is less than or equal to one; and in response to the number of DPB parameter syntax structures being equal to one, code the bitstream without signaling the first DPB syntax element in the VPS.

41. The apparatus of clause 39, wherein the processor is configured to execute the instructions to:
in response to the number of DPB parameter syntax structures being greater than one and different from the number of the OLSs, signal, in the VPS, the first DPB syntax element with a variable length.

42. An apparatus, comprising:
a memory configured to store instructions; and
a processor coupled to the memory and configured to execute the instructions to cause the apparatus to:
determine whether at least one of a profile, tier and level (PTL) syntax structure, a decoded picture buffer (DPB) parameters syntax structure, or a hypothetical reference decoder (HRD) parameters syntax structure is present in a Sequence Parameter Set (SPS) of a bitstream;
determine whether a first value is greater than one, the first value specifying a maximum number of temporal sublayers present in a coded layer video sequence (CLVS) referring to the SPS; and
when at least one of the PTL syntax structure, the DPB parameters syntax structure, or the HRD parameters syntax structure is present in the SPS and the first value is greater than one, signal a flag configured to control a presence of syntax elements in the DPB parameters syntax structure in the SPS.

43. The apparatus of clause 42, wherein the processor is configured to execute the instructions to:
when the first value is equal to or smaller than one, signaling one or more syntax elements in the DPB parameters syntax structure, without signaling the flag in the SPS.

44. An apparatus, comprising:
a memory configured to store instructions; and
a processor coupled to the memory and configured to execute the instructions to cause the apparatus to:
determine a value of a first Sequence Parameter Set (SPS) syntax element, the first SPS syntax element specifying an identifier of a video parameter set (VPS) referred to by the SPS when the value of the first SPS syntax element is greater than zero;
in response to the value of the first SPS syntax element is greater than zero, assign a range of a second SPS syntax element specifying a maximum number of temporal sublayers present in each coded layer video sequence (CLVS) referring to the SPS based on a corresponding VPS syntax element; and
in response to the value of the first SPS syntax element equal to zero, assign the range of the second SPS syntax element specifying the maximum number of temporal sublayers present in each CLVS referring to the SPS to be an inclusive range of zero to a fixed value.

45. An apparatus, comprising:
a memory configured to store instructions; and
a processor coupled to the memory and configured to execute the instructions to cause the apparatus to:
code one or more profile, tier and level (PTL) syntax elements specifying PTL related information; and
signal the one or more PTL syntax elements with the variable length in a video parameter set (VPS) or a Sequence Parameter Set (SPS) of a bitstream.

46. The apparatus of clause 45, wherein the processor is configured to execute the instructions to code the one or more PTL syntax elements by:
coding a first PTL syntax element with the variable length, the first PTL syntax element specifying an index of a PTL syntax structure.

47. The apparatus of clause 46, wherein the VPS or the SPS comprises N PTL syntax structures, N being an integer, and the processor is configured to execute the instructions to code the one or more PTL syntax elements by:
setting a length of the first PTL syntax element to be a smallest integer greater than or equal to a base-2 logarithm of N.

48. The apparatus of clause 46, wherein the processor is configured to execute the instructions to code the one or more PTL syntax elements by:
coding the first PTL syntax element by using an Exponential-Golomb code.

49. The apparatus of clause 45, wherein the VPS or the SPS comprises N PTL syntax structures, N being an integer, and the processor is configured to execute the instructions to code the one or more PTL syntax elements by:
coding a second PTL syntax element with the variable length, the second PTL syntax element specifying the N.

50. An apparatus, comprising:
a memory configured to store instructions; and
a processor coupled to the memory and configured to execute the instructions to cause the apparatus to:
code a video parameter set (VPS) syntax element with variable length; and
signal, in a VPS, the VPS syntax element, the VPS syntax element being associated with the number of output layer sets (OLSs) contained in a coded video sequence (CVS) referring to the VPS.

51. The apparatus of clause 50, wherein the processor is configured to execute the instructions to:
set a length of the VPS syntax element to be equal to a maximum allowed number of layers in the coded video sequence (CVS) referring to the VPS, when the maximum allowed number is smaller than a predefined length value.

52. An apparatus, comprising:
a memory configured to store instructions; and
a processor coupled to the memory and configured to execute the instructions to cause the apparatus to:
receive a bitstream comprising a coded video sequence (CVS);
determine whether the CVS has equal number of profile, tier and level (PTL) syntax structures and output layer sets (OLSs); and
in response to the number of PTL syntax structures being equal to the number of the OLSs, skip decoding a first PTL syntax element specifying an index, to a list of PTL syntax structures in the VPS, of a PTL syntax structure that applies to a corresponding OLS when decoding the VPS.

53. The apparatus of clause 52, wherein the processor is configured to execute the instructions to:
in response to the number of PTL syntax structures being equal to the number of the OLSs, determine the first PTL syntax element to be equal to an index of the OLS to which the PTL syntax structure specified by the first PTL syntax element applies.

54. The apparatus of clause 52, wherein the processor is configured to execute the instructions to:
determine whether the number of PTL syntax structures being equal to one; and in response the number of PTL syntax structures being equal to one, skip decoding the first PTL syntax element when decoding the VPS.

55. The apparatus of clause 54, wherein the processor is configured to execute the instructions to:
in response to the number of PTL syntax structures being equal to one, determining the first PTL syntax element to be zero.

56. The apparatus of clause 52, wherein the processor is configured to execute the instructions to:
in response to the number of PTL syntax structures being greater than one and different from the number of the OLSs, decode the first PTL syntax element with a fixed length in the VPS.

57. An apparatus, comprising:
a memory configured to store instructions; and
a processor coupled to the memory and configured to execute the instructions to cause the apparatus to:
receive a bitstream comprising a coded video sequence (CVS);
determine whether the CVS has equal number of decoded picture buffer (DPB) parameter syntax structures and output layer sets (OLSs); and
in response to the CVS having equal number of DPB parameter syntax structures and OLSs, skip decoding a first DPB syntax element specifying an index, to a list of DPB parameter syntax structures in the VPS, of an DPB parameter syntax structure that applies to a corresponding OLS.

58. The apparatus of clause 57, wherein the processor is configured to execute the instructions to:
determine whether the number of DPB parameter syntax structures is less than or equal to one; and
in response to the number of DPB parameter syntax structures is less than or equal to one, skip decoding the first DPB syntax element when decoding the VPS.

59. The apparatus of clause 58, wherein the processor is configured to execute the instructions to:
in response to the number of DPB parameter syntax structures being less than or equal to one, determine the first DPB syntax element to be zero; and
in response to the number of DPB syntax structures being equal to the number of the OLSs, determine the first DPB syntax element to be equal to an index of the OLS to which the DPB parameter syntax structure specified by the first DPB syntax element applies.

60. The apparatus of clause 58, wherein the processor is configured to execute the instructions to:
in response to the number of DPB parameter syntax structures being greater than one and different from the number of the OLSs, decode the first DPB syntax element with a variable length in the VPS.

61. An apparatus, comprising:
a memory configured to store instructions; and
a processor coupled to the memory and configured to execute the instructions to cause the apparatus to:
receive a bitstream comprising a video parameter set (VPS) and a Sequence Parameter Set (SPS);
in response to at least one of a profile, tier and level (PTL) syntax structure, a decoded picture buffer (DPB) parameters syntax structure, or a hypothetical reference decoder (HRD) parameters syntax structure being present in the SPS, determine whether a first value specifying a maximum number of temporal sublayers being present in each coded layer video sequence (CLVS) referring to the SPS is greater than one; and in response to the first value being greater than one, decode a flag configured to control a presence of syntax elements in the DPB parameters syntax structure in the SPS.

62. The apparatus of clause 61, wherein the processor is configured to execute the instructions to:
in response to the first value being equal to or smaller than one, infer the flag equal to zero and decode one or more syntax elements in the DPB parameters syntax structure without decoding the flag in the SPS.

63. An apparatus, comprising:
a memory configured to store instructions; and
a processor coupled to the memory and configured to execute the instructions to cause the apparatus to:
determine a value of a first Sequence Parameter Set (SPS) syntax element, the first SPS syntax element specifying an identifier of a video parameter set (VPS) referred to by a SPS when the value of the first SPS syntax element is greater than zero; and
decode a second SPS syntax element specifying a maximum number of temporal sublayers present in each coded layer video sequence (CLVS) referring to the SPS, a range of the second SPS syntax element being based on a corresponding VPS syntax element of the VPS referred to by the SPS when the value of the first SPS syntax element is greater than zero, or being based on a fixed value when the value of the first SPS syntax element is equal to zero.

64. An apparatus, comprising:
a memory configured to store instructions; and
a processor coupled to the memory and configured to execute the instructions to cause the apparatus to:
receive a bitstream comprising a video parameter set (VPS) or a Sequence Parameter Set (SPS); and
decode one or more profile, tier and level (PTL) syntax elements in the VPS or the SPS, the one or more PTL syntax elements specifying PTL related information.

65. The apparatus of clause 64, wherein the processor is configured to execute the instructions to decode the one or more PTL syntax elements by:
decoding a first PTL syntax element with the variable length, the first PTL syntax element specifying an index of a PTL syntax structure.

66. The apparatus of clause 65, wherein the VPS or the SPS comprises N PTL syntax structures, N being an integer, and a length of the first PTL syntax element is a smallest integer greater than or equal to a base-2 logarithm of N.

67. The apparatus of clause 65, wherein the first PTL syntax element is coded by using an Exponential-Golomb code.

68. The apparatus of clause 64, wherein the VPS or the SPS comprises N PTL syntax structures, N being an integer, and the processor is configured to execute the instructions to decode the one or more PTL syntax elements by:
decoding a second PTL syntax element with the variable length, the second PTL syntax element specifying the N.

69. An apparatus, comprising:
a memory configured to store instructions; and
a processor coupled to the memory and configured to execute the instructions to cause the apparatus to:
receive a bitstream comprising a video parameter set (VPS); and
decode a VPS syntax element with a variable length in the VPS, the VPS syntax element being associated with the number of output layer sets (OLSs) contained in a coded video sequence (CVS) referring to the VPS.
70. The apparatus of clause 69, wherein a length of the VPS syntax element is equal to a maximum allowed number of layers in the coded video sequence (CVS) referring to the VPS, when the maximum allowed number is smaller than a predefined length value.
71. A non-transitory computer-readable storage medium storing a set of instructions that are executable by one or more processors of a device to cause the device to perform a method for encoding video, comprising:
determining whether a coded video sequence (CVS) contains equal number of profile, tier and level (PTL) syntax structures and output layer sets (OLSs); and
in response to the CVS containing equal number of PTL syntax structures and OLSs, coding the bitstream without signaling a first PTL syntax element specifying an index, to a list of PTL syntax structures in the VPS, of a PTL syntax structure that applies to a corresponding OLS in the VPS.
72. The non-transitory computer-readable storage medium of clause 71, wherein the set of instructions that are executable by the one or more processors of the device causes the device to further perform:
determining whether the number of PTL syntax structures being equal to one; and
in response to the number of PTL syntax structures being equal to one, coding the bitstream without signaling the first PTL syntax element in the VPS.
73. The non-transitory computer-readable storage medium of clause 71, wherein the set of instructions that are executable by the one or more processors of the device causes the device to further perform:
in response to the number of PTL syntax structures being greater than one and different from the number of the OLSs, signaling, in the VPS, the first PTL syntax element with a fixed length.
74. A non-transitory computer-readable storage medium storing a set of instructions that are executable by one or more processors of a device to cause the device to perform a method for encoding video, comprising:
determining whether a coded video sequence (CVS) has equal number of decoded picture buffer (DPB) parameter syntax structures and output layer sets (OLSs); and
in response to the CVS having equal number of DPB parameter syntax structures and OLSs, coding the bitstream without signaling a first DPB syntax element specifying an index, to a list of DPB parameter syntax structures in the VPS, of a DPB parameter syntax structure that applies to a corresponding OLS.
75. The non-transitory computer-readable storage medium of clause 74, wherein the set of instructions that are executable by the one or more processors of the device causes the device to further perform:
determining whether the number of DPB parameter syntax structures is less than or equal to one; and
in response to the number of DPB parameter syntax structures being equal to one, coding the bitstream without signaling the first DPB syntax element in the VPS.
76. The non-transitory computer-readable storage medium of clause 74, wherein the set of instructions that are executable by the one or more processors of the device causes the device to further perform:
in response to the number of DPB parameter syntax structures being greater than one and different from the number of the OLSs, signaling, in the VPS, the first DPB syntax element with a variable length.
77. A non-transitory computer-readable storage medium storing a set of instructions that are executable by one or more processors of a device to cause the device to perform a method for encoding video, comprising:
determining whether at least one of a profile, tier and level (PTL) syntax structure, a decoded picture buffer (DPB) parameters syntax structure, or a hypothetical reference decoder (HRD) parameters syntax structure is present in a Sequence Parameter Set (SPS) of a bitstream;
determining whether a first value is greater than one, the first value specifying a maximum number of temporal sublayers present in a coded layer video sequence (CLVS) referring to the SPS; and
when at least one of the PTL syntax structure, the DPB parameters syntax structure, or the HRD parameters syntax structure is present in the SPS and the first value is greater than one, signaling a flag configured to control a presence of syntax elements in the DPB parameters syntax structure in the SPS.
78. The non-transitory computer-readable storage medium of clause 77, wherein the set of instructions that are executable by the one or more processors of the device causes the device to further perform:
when the first value is equal to or smaller than one, signaling one or more syntax elements in the DPB parameters syntax structure, without signaling the flag in the SPS.
79. A non-transitory computer-readable storage medium storing a set of instructions that are executable by one or more processors of a device to cause the device to perform a method for encoding video, comprising:
determining a value of a first Sequence Parameter Set (SPS) syntax element, the first SPS syntax element specifying an identifier of a video parameter set (VPS) referred to by the SPS when the value of the first SPS syntax element is greater than zero;
in response to the value of the first SPS syntax element is greater than zero, assigning a range of a second SPS syntax element specifying a maximum number of temporal sublayers present in each coded layer video sequence (CLVS) referring to the SPS based on a corresponding VPS syntax element; and
in response to the value of the first SPS syntax element equal to zero, assigning the range of the second SPS syntax element specifying the maximum number of temporal sublayers present in each CLVS referring to the SPS to be an inclusive range of zero to a fixed value.
80. A non-transitory computer-readable storage medium storing a set of instructions that are executable by one or more processors of a device to cause the device to perform a method for encoding video, comprising:
coding one or more profile, tier and level (PTL) syntax elements specifying PTL related information; and
signaling the one or more PTL syntax elements with the variable length in a video parameter set (VPS) or a Sequence Parameter Set (SPS) of a bitstream.
81. The non-transitory computer-readable storage medium of clause 80, wherein the set of instructions that are executable by the one or more processors of the device causes the device to code the one or more PTL syntax elements by:
coding a first PTL syntax element with the variable length, the first PTL syntax element specifying an index of a PTL syntax structure.

82. The non-transitory computer-readable storage medium of clause 81, wherein the VPS or the SPS comprises N PTL syntax structures, N being an integer, and the set of instructions that are executable by the one or more processors of the device causes the device to code the one or more PTL syntax elements by:
setting a length of the first PTL syntax element to be a smallest integer greater than or equal to a base-2 logarithm of N.

83. The non-transitory computer-readable storage medium of clause 81, wherein the set of instructions that are executable by the one or more processors of the device causes the device to code the one or more PTL syntax elements by:
coding the first PTL syntax element by using an Exponential-Golomb code.

84. The non-transitory computer-readable storage medium of clause 80, wherein the VPS or the SPS comprises N PTL syntax structures, N being an integer, and the set of instructions that are executable by the one or more processors of the device causes the device to code the one or more PTL syntax elements by:
coding a second PTL syntax element with the variable length, the second PTL syntax element specifying the N.

85. A non-transitory computer-readable storage medium storing a set of instructions that are executable by one or more processors of a device to cause the device to perform a method for encoding video, comprising:
coding a video parameter set (VPS) syntax element with variable length; and
signaling, in a VPS, the VPS syntax element, the VPS syntax element being associated with the number of output layer sets (OLSs) contained in a coded video sequence (CVS) referring to the VPS.

86. The non-transitory computer-readable storage medium of clause 85, wherein the set of instructions that are executable by the one or more processors of the device causes the device to further perform:
setting a length of the VPS syntax element to be equal to a maximum allowed number of layers in the coded video sequence (CVS) referring to the VPS, when the maximum allowed number is smaller than a predefined length value.

87. A non-transitory computer-readable storage medium storing a set of instructions that are executable by one or more processors of a device to cause the device to perform a method for decoding video, comprising:
receiving a bitstream comprising a coded video sequence (CVS);
determining whether the CVS has equal number of profile, tier and level (PTL) syntax structures and output layer sets (OLSs); and
in response to the number of PTL syntax structures being equal to the number of the OLSs, skipping decoding a first PTL syntax element specifying an index, to a list of PTL syntax structures in the VPS, of a PTL syntax structure that applies to a corresponding OLS when decoding the VPS.

88. The non-transitory computer-readable storage medium of clause 87, wherein the set of instructions that are executable by the one or more processors of the device causes the device to further perform:
in response to the number of PTL syntax structures being equal to the number of the OLSs, determining the first PTL syntax element to be equal to an index of the OLS to which the PTL syntax structure specified by the first PTL syntax element applies.

89. The non-transitory computer-readable storage medium of clause 87, wherein the set of instructions that are executable by the one or more processors of the device causes the device to further perform:
determining whether the number of PTL syntax structures being equal to one; and
in response the number of PTL syntax structures being equal to one, skipping decoding the first PTL syntax element when decoding the VPS.

90. The non-transitory computer-readable storage medium of clause 89, wherein the set of instructions that are executable by the one or more processors of the device causes the device to further perform:
in response to the number of PTL syntax structures being equal to one, determining the first PTL syntax element to be zero.

91. The non-transitory computer-readable storage medium of clause 87, wherein the set of instructions that are executable by the one or more processors of the device causes the device to further perform:
in response to the number of PTL syntax structures being greater than one and different from the number of the OLSs, decoding the first PTL syntax element with a fixed length in the VPS.

92. A non-transitory computer-readable storage medium storing a set of instructions that are executable by one or more processors of a device to cause the device to perform a method for decoding video, comprising:
receiving a bitstream comprising a coded video sequence (CVS);
determining whether the CVS has equal number of decoded picture buffer (DPB) parameter syntax structures and output layer sets (OLSs); and
in response to the CVS having equal number of DPB parameter syntax structures and OLSs, skipping decoding a first DPB syntax element specifying an index, to a list of DPB parameter syntax structures in the VPS, of an DPB parameter syntax structure that applies to a corresponding OLS.

93. The non-transitory computer-readable storage medium of clause 92, wherein the set of instructions that are executable by the one or more processors of the device causes the device to further perform:
determining whether the number of DPB parameter syntax structures is less than or equal to one; and
in response to the number of DPB parameter syntax structures is less than or equal to one, skipping decoding the first DPB syntax element when decoding the VPS.

94. The non-transitory computer-readable storage medium of clause 93, wherein the set of instructions that are executable by the one or more processors of the device causes the device to further perform:
in response to the number of DPB parameter syntax structures being less than or equal to one, determining the first DPB syntax element to be zero; and
in response to the number of DPB syntax structures being equal to the number of the OLSs, determining the first DPB syntax element to be equal to an index of the OLS to which the DPB parameter syntax structure specified by the first DPB syntax element applies.

95. The non-transitory computer-readable storage medium of clause 93, wherein the set of instructions that are executable by the one or more processors of the device causes the device to further perform:

in response to the number of DPB parameter syntax structures being greater than one and different from the number of the OLSs, decoding the first DPB syntax element with a variable length in the VPS.

96. A non-transitory computer-readable storage medium storing a set of instructions that are executable by one or more processors of a device to cause the device to perform a method for decoding video, comprising:
receiving a bitstream comprising a video parameter set (VPS) and a Sequence Parameter Set (SPS);
in response to at least one of a profile, tier and level (PTL) syntax structure, a decoded picture buffer (DPB) parameters syntax structure, or a hypothetical reference decoder (HRD) parameters syntax structure being present in the SPS, determining whether a first value specifying a maximum number of temporal sublayers being present in each coded layer video sequence (CLVS) referring to the SPS is greater than one; and
in response to the first value being greater than one, decoding a flag configured to control a presence of syntax elements in the DPB parameters syntax structure in the SPS.

97. The non-transitory computer-readable storage medium of clause 96, wherein the set of instructions that are executable by the one or more processors of the device causes the device to further perform:
in response to the first value being equal to or smaller than one, inferring the flag equal to zero and decoding one or more syntax elements in the DPB parameters syntax structure without decoding the flag in the SPS.

98. A non-transitory computer-readable storage medium storing a set of instructions that are executable by one or more processors of a device to cause the device to perform a method for decoding video, comprising:
determining a value of a first Sequence Parameter Set (SPS) syntax element, the first SPS syntax element specifying an identifier of a video parameter set (VPS) referred to by a SPS when the value of the first SPS syntax element is greater than zero; and
decoding a second SPS syntax element specifying a maximum number of temporal sublayers present in each coded layer video sequence (CLVS) referring to the SPS, a range of the second SPS syntax element being based on a corresponding VPS syntax element of the VPS referred to by the SPS when the value of the first SPS syntax element is greater than zero, or being based on a fixed value when the value of the first SPS syntax element is equal to zero.

99. A non-transitory computer-readable storage medium storing a set of instructions that are executable by one or more processors of a device to cause the device to perform a method for decoding video, comprising:
receiving a bitstream comprising a video parameter set (VPS) or a Sequence Parameter Set (SPS); and
decoding one or more profile, tier and level (PTL) syntax elements in the VPS or the SPS, the one or more PTL syntax elements specifying PTL related information.

100. The non-transitory computer-readable storage medium of clause 99, wherein the set of instructions that are executable by the one or more processors of the device causes the device to decode the one or more PTL syntax elements by:
decoding a first PTL syntax element with the variable length, the first PTL syntax element specifying an index of a PTL syntax structure.

101. The non-transitory computer-readable storage medium of clause 100, wherein the VPS or the SPS comprises N PTL syntax structures, N being an integer, and a length of the first PTL syntax element is a smallest integer greater than or equal to a base-2 logarithm of N.

102. The non-transitory computer-readable storage medium of clause 100, wherein the first PTL syntax element is coded by using an Exponential-Golomb code.

103. The non-transitory computer-readable storage medium of clause 99, wherein the VPS or the SPS comprises N PTL syntax structures, N being an integer, and the set of instructions that are executable by the one or more processors of the device causes the device to decode the one or more PTL syntax elements by:
decoding a second PTL syntax element with the variable length, the second PTL syntax element specifying the N.

104. A non-transitory computer-readable storage medium storing a set of instructions that are executable by one or more processors of a device to cause the device to perform a method for decoding video, comprising:
receiving a bitstream comprising a video parameter set (VPS); and
decoding a VPS syntax element with a variable length in the VPS, the VPS syntax element being associated with the number of output layer sets (OLSs) contained in a coded video sequence (CVS) referring to the VPS.

105. The non-transitory computer-readable storage medium of clause 104, wherein a length of the VPS syntax element is equal to a maximum allowed number of layers in the coded video sequence (CVS) referring to the VPS, when the maximum allowed number is smaller than a predefined length value.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for encoding video, comprising:
   determining whether a coded video sequence (CVS) contains equal number of profile, tier and level (PTL) syntax structures and output layer sets (OLSs); and
   in response to the CVS containing equal number of PTL syntax structures and OLSs, coding a bitstream without signaling a first PTL syntax element specifying an index, to a list of PTL syntax structures in a video parameter set (VPS), of a PTL syntax structure that applies to a corresponding OLS in the VPS.

2. The method according to claim 1, further comprising:
   determining whether the number of PTL syntax structures being equal to one; and
   in response to the number of PTL syntax structures being equal to one, coding the bitstream without signaling the first PTL syntax element in the VPS.

3. The method according to claim 1, further comprising:
   in response to the number of PTL syntax structures being greater than one and different from the number of the OLSs, signaling, in the VPS, the first PTL syntax element with a fixed length.

4. The method according to claim 1, further comprising:
   determining whether at least one of the PTL syntax structure, a decoded picture buffer (DPB) parameters syntax structure, or a hypothetical reference decoder (HRD) parameters syntax structure is present in a Sequence Parameter Set (SPS) of the bitstream;
   determining whether a first value is greater than one, the first value specifying a maximum number of temporal sublayers present in a coded layer video sequence (CLVS) referring to the SPS; and
   when at least one of the PTL syntax structure, the DPB parameters syntax structure, or the HRD parameters syntax structure is present in the SPS and the first value is greater than one, signaling a flag configured to control a presence of syntax elements in the DPB parameters syntax structure in the SPS.

5. The method of claim 4, further comprising:
   when the first value is equal to or smaller than one, signaling one or more syntax elements in the DPB parameters syntax structure, without signaling the flag in the SPS.

6. The method according to claim 1, further comprising:
   determining a value of a first Sequence Parameter Set (SPS) syntax element, the first SPS syntax element specifying an identifier of the VPS referred to by the SPS when the value of the first SPS syntax element is greater than zero;
   in response to the value of the first SPS syntax element is greater than zero, assigning a range of a second SPS syntax element specifying a maximum number of temporal sublayers present in each coded layer video sequence (CLVS) referring to the SPS based on a corresponding VPS syntax element; and
   in response to the value of the first SPS syntax element equal to zero, assigning the range of the second SPS syntax element specifying the maximum number of temporal sublayers present in each CLVS referring to the SPS to be an inclusive range of zero to a fixed value.

7. A computer-implemented method for decoding video, comprising:
   receiving a bitstream comprising a coded video sequence (CVS);
   determining whether the CVS has equal number of profile, tier and level (PTL) syntax structures and output layer sets (OLSs); and
   in response to the number of PTL syntax structures being equal to the number of the OLSs, skipping decoding a first PTL syntax element specifying an index, to a list of PTL syntax structures in a video parameter set (VPS), of a PTL syntax structure that applies to a corresponding OLS when decoding the VPS.

8. The method according to claim 7, further comprising:
   in response to the number of PTL syntax structures being equal to the number of the OLSs, determining the first PTL syntax element to be equal to an index of the OLS to which the PTL syntax structure specified by the first PTL syntax element applies.

9. The method according to claim 7, further comprising:
   determining whether the number of PTL syntax structures being equal to one; and
   in response the number of PTL syntax structures being equal to one, skipping decoding the first PTL syntax element when decoding the VPS.

10. The method according to claim 9, further comprising:
    in response to the number of PTL syntax structures being equal to one, determining the first PTL syntax element to be zero.

11. The method according to claim 7, further comprising:
    in response to the number of PTL syntax structures being greater than one and different from the number of the OLSs, decoding the first PTL syntax element with a fixed length in the VPS.

12. The method according to claim 7, wherein the bitstream comprising the VPS and a Sequence Parameter Set (SPS), the method further comprising:
in response to at least one of the PTL syntax structure, a decoded picture buffer (DPB) parameters syntax structure, or a hypothetical reference decoder (HRD) parameters syntax structure being present in the SPS, determining whether a first value specifying a maximum number of temporal sublayers being present in each coded layer video sequence (CLVS) referring to the SPS is greater than one; and
in response to the first value being greater than one, decoding a flag configured to control a presence of syntax elements in the DPB parameters syntax structure in the SPS.

13. The method of claim 12, further comprising:
in response to the first value being equal to or smaller than one, inferring the flag equal to zero and decoding one or more syntax elements in the DPB parameters syntax structure without decoding the flag in the SPS.

14. The method of claim 7, further comprising: determining a value of a first Sequence Parameter Set (SPS) syntax element, the first SPS syntax element specifying an identifier of the VPS referred to by a SPS when the value of the first SPS syntax element is greater than zero; and
decoding a second SPS syntax element specifying a maximum number of temporal sublayers present in each coded layer video sequence (CLVS) referring to the SPS, a range of the second SPS syntax element being based on a corresponding VPS syntax element of the VPS referred to by the SPS when the value of the first SPS syntax element is greater than zero, or being based on a fixed value when the value of the first SPS syntax element is equal to zero.

15. An apparatus, comprising:
a memory configured to store instructions; and
a processor coupled to the memory and configured to execute the instructions to cause the apparatus to:
receive a bitstream comprising a coded video sequence (CVS);
determine whether the CVS has equal number of profile, tier and level (PTL) syntax structures and output layer sets (OLSs); and
in response to the number of PTL syntax structures being equal to the number of the OLSs, skip decoding a first PTL syntax element specifying an index, to a list of PTL syntax structures in a video parameter set (VPS), of a PTL syntax structure that applies to a corresponding OLS when decoding the VPS.

16. The apparatus of claim 15, wherein the processor is configured to execute the instructions to:
in response to the number of PTL syntax structures being equal to the number of the OLSs, determine the first PTL syntax element to be equal to an index of the OLS to which the PTL syntax structure specified by the first PTL syntax element applies.

17. The apparatus of claim 15, wherein the processor is configured to execute the instructions to:
determine whether the number of PTL syntax structures being equal to one; and
in response to the number of PTL syntax structures being equal to one, skip decoding the first PTL syntax element when decoding the VPS.

18. The apparatus of claim 17, wherein the processor is configured to execute the instructions to:
in response to the number of PTL syntax structures being equal to one, determining the first PTL syntax element to be zero.

19. The apparatus of claim 15, wherein the processor is configured to execute the instructions to:
in response to the number of PTL syntax structures being greater than one and different from the number of the OLSs, decode the first PTL syntax element with a fixed length in the VPS.

20. The apparatus of claim 15, wherein the processor is configured to execute the instructions to:
determine a value of a first Sequence Parameter Set (SPS) syntax element, the first SPS syntax element specifying an identifier of the VPS referred to by a SPS when the value of the first SPS syntax element is greater than zero; and
decode a second SPS syntax element specifying a maximum number of temporal sublayers present in each coded layer video sequence (CLVS) referring to the SPS, a range of the second SPS syntax element being based on a corresponding VPS syntax element of the VPS referred to by the SPS when the value of the first SPS syntax element is greater than zero, or being based on a fixed value when the value of the first SPS syntax element is equal to zero.

* * * * *